US008359588B2

(12) United States Patent
Reid

(10) Patent No.: US 8,359,588 B2
(45) Date of Patent: Jan. 22, 2013

(54) REDUCING INTER-TASK LATENCY IN A MULTIPROCESSOR SYSTEM

(75) Inventor: Alastair David Reid, Cambridgeshire (GB)

(73) Assignee: Arm Limited, Cambridge (GB)

( * ) Notice: Subject to any disclaimer, the term of this patent is extended or adjusted under 35 U.S.C. 154(b) by 662 days.

(21) Appl. No.: 12/591,661

(22) Filed: Nov. 25, 2009

(65) Prior Publication Data

US 2011/0125986 A1    May 26, 2011

(51) Int. Cl.
*G06F 9/45* (2006.01)
(52) U.S. Cl. ........ 717/159; 717/151; 717/157; 717/149; 717/133; 719/330
(58) Field of Classification Search .................. None
See application file for complete search history.

(56) References Cited

U.S. PATENT DOCUMENTS

| | | | | |
|---|---|---|---|---|
| 5,404,523 A * | 4/1995 | DellaFera et al. | ............ | 718/101 |
| 5,822,563 A * | 10/1998 | Sitbon et al. | ............ | 719/330 |
| 5,860,010 A * | 1/1999 | Attal | ............ | 717/137 |
| 6,088,511 A * | 7/2000 | Hardwick | ............ | 717/149 |
| 6,106,575 A * | 8/2000 | Hardwick | ............ | 717/119 |
| 6,438,551 B1 * | 8/2002 | Holmskar | ............ | 708/105 |
| 6,826,763 B1 * | 11/2004 | Wang et al. | ............ | 719/330 |
| 7,624,398 B2 * | 11/2009 | Wang et al. | ............ | 719/315 |
| 2002/0078255 A1 * | 6/2002 | Narayan | ............ | 709/316 |
| 2005/0273772 A1 * | 12/2005 | Matsakis et al. | ............ | 717/136 |
| 2008/0114937 A1 | 5/2008 | Reid et al. | | |
| 2008/0215768 A1 | 9/2008 | Reid et al. | | |
| 2010/0153934 A1 * | 6/2010 | Lachner | ............ | 717/146 |

OTHER PUBLICATIONS

Title:Reducing Memory ordering overheads in software transactional memory, author: Spear, M. F, dated: Mar. 22, 2009 source: IEEE.*
Title: Reducing memory latency using a samll software driven array cache, author: Chi-Hung Chi, dated: Jan. 3, 1995, source: IEEE.*
Eide et al., "Flick: A Flexible, Optimizing IDL Compiler", *ACM SIGPLAN '97 Conference,* Jun. 15-18, 1997, pp. 1-13.
Bershad et al., (Presentation) "Lightweight RPC", 17 pages, Dated: 1990.
Don Sandler, (Presentation) "Optimizing RPC", *Comp 520,* Sep. 9, 2004, 35 pages.
Allen et al., "Conversion of Control Dependence to Data Dependence", *Dept. of Mathematical Sciences,* Rice University, 1983, pp. 177-189.

* cited by examiner

*Primary Examiner* — Chameli Das
(74) *Attorney, Agent, or Firm* — Nixon & Vanderhye P.C.

(57) ABSTRACT

A method of reducing inter-task latency for software comprising a sequence of instructions including a synchronous remote procedure call to be executed on a multiprocessor system comprising a calling processor and at least one remote engine. The method comprises the steps of: inputting the software; inputting a runtime resource description describing a runtime environment of the multiprocessor system; identifying the synchronous remote procedure call in the sequence of instructions; replacing the synchronous remote procedure call in the sequence of instructions with an initiation instruction and a wait instruction to generate a substitute sequence of instructions; reordering the substitute sequence of instructions with reference to the runtime resource description and the dependencies to generate a reordered sequence of instructions; and outputting the reordered sequence of instructions.

37 Claims, 11 Drawing Sheets

REDUCING INTER-TASK LATENCY IN A MULTIPROCESSOR SYSTEM

BACKGROUND OF THE INVENTION

1. Field of the Invention

The present invention relates to reducing inter-task latency in a multi-processor system. More particularly, this invention relates to reducing inter-task latency in a multiprocessor system on which software is executed which includes at least one synchronous remote procedure call.

2. Description of the Prior Art

Remote procedures calls (RPCs) are a known technique for programming multiprocessor systems. An RPC typically allows a program executing on one processor to cause a task to be executed by another processor in the multiprocessor system. In U.S. patent application Ser. No. 11/976,315 the concept of using RPCs to cause the execution of tasks on accelerators (such as DMA engines, data engines etc.) in the multiprocessor system is discussed.

RPCs may be categorised as either synchronous RPCs or asynchronous RPCs. From a programming point of view a synchronous RPC is the simpler of the two and operates much like a function call, except that the function is performed remotely on another processor or engine as is illustrated in FIG. 1A. In this example, the control processor (CP) is performing a sequence of operations in accordance with the instructions it is executing and at point 10 begins execution of an instruction to execute a synchronous RPC, which comprises triggering a remote processor (RP) to perform function A. CP sets up the required inputs to function A, for example by placing them in a memory space that RP can access, and then triggers RP to begin execution of function A by sending an appropriate signal (illustrated here as "do A"). Hence at 12, RP begins execution of function A. Whilst RP is executing function A CP waits until it receives a completion signal from RP. RP completes function A at 14 and sends the completion signal ("done A") to CP. At 16, CP wakes up in response to the completion signal from RP, reads the outputs of the function A (which RP has placed in a memory space accessible to CP) and continues execution of its sequence of instructions.

The feature of a synchronous RPC which makes it "synchronous" is the fact that the control processor waits for the remote processor before continuing execution (i.e. CP waits between 10 and 16 in FIG. 1). This synchronisation between the controller and remote processors makes synchronous RPCs easier to program, because there is no parallelism between the two processors. However, this ease of programming also results in some inter-task latency between tasks carried out in such a multiprocessor system.

For example, as illustrated in FIG. 1B, if CP executes a first synchronous RPC to cause RP to execute function A, and once it receives the signal "done A" from RP it executes a second synchronous RPC to cause RP to execute function B, there will be a delay between 14 (when RP sends signal "done A" to CP), 16 (when CP receives this signal), 18 (when CP executes the second synchronous RPC and sends signal "do B" to RP), and 20 (when RP begins execution of function B). Finally, once RP completes function B at 22, signals CP with "done B" and CP has received this signal at 24, CP can recommence execution of its instruction sequence.

The inter-task latency associated with synchronous RPCs can be reduced by exploiting parallelism between CP and RP, as illustrated in FIGS. 2A, 2B, 2C and 2D, and instead making use of asynchronous RPCs. In particular, if RP supports a task queue which allows multiple RPCs to be queued ready for execution, this allows CP to place multiple RPCs requests into the task queue which can have various benefits as explained in the following.

FIG. 2A illustrates a situation in which CP requires two functions A and B to be executed by RP (as in FIG. 1B). RP in this example has a task queue which can accept a pending task to be executed whilst a current task is already executing. Hence, having initiated function A at 30, at 32 CP is able to signal RP to execute function B, this pending task being placed in RPs task queue, such that at 34 (when function A completes) RP can both signal CP that function A has completed ("done A") and immediately initiate execution of function B. When function B completes at 36, RP signals CP that B has completed ("done B") and on receipt of this signal at 38 CP continues execution on a sequence of instructions. Hence it can be seen that the use of asynchronous RPCs can substantially reduce the inter-task latency when a sequence of RPCs are executed on a single remote processor.

If CP wishes to perform a sequence of N synchronous RPCs, it must wait for each task to complete and therefore the RP must signal N times and CP must wait N times. However, as illustrated in FIG. 2B, when using asynchronous RPCs with a task queue with a capacity of N (i.e. the task queue is capable of holding N RPCs requests) CP need only wait for the last task to complete. As illustrated in FIG. 2B, at 40 CP signals to RP that N RPCs should be added to its task queue and at 42 RP begins execution of this series of RPCs. On completion of $RPC_N$ at 44, RP signals that the last RPC is complete to CP, which at 46 continues execution of its sequence of instructions. The cost associating with signalling and waiting can be significant, so using asynchronous RPCs can reduce the task invocation overhead by up to N times.

The multiprocessor system can consist of more than one remote processor, as illustrated in FIG. 2C. In the situation where CP wishes to perform an RPC on $RP_1$ and then to execute another RPC on $RP_2$ this can be done (using synchronous or asynchronous RPCs) by causing $RP_1$ to signal CP when the first RPC completes, and CP then initiating the second RPC on $RP_2$. However, if the two remote processors are able to signal each other, then asynchronous RPCs allow CP to initiate the first RPC on $RP_1$, further indicating to $RP_1$ that it should signal $RP_2$ when it has completed its task. At the same time CP can queue up the second RPC on $RP_2$, indicating that it should not start execution until the signal from $RP_1$ arrives. This way of executing is only possible if asynchronous RPCs are used and if a suitable signalling mechanism exists, as illustrated in FIG. 2C. At 50, CP signals $RP_1$ ("do A") and further signals $RP_2$ to begin function B when $RP_2$ receives "done A" from $RP_1$ (i.e. CP sends "do B when done A received"). At 52, when $RP_1$ completes A, it signals this fact to $RP_2$ ("done A") and at 54 $RP_2$ begins execution of function B. At 56, when $RP_2$ has completed function B, it signals this fact to CP ("done B") and at 58 CP continues execution of its sequence of instructions. Hence it can be seen that the use of asynchronous RPCs allows inter-task latency to be reduced, even if the sequence of RPCs is spread across multiple processors.

If CP wishes to perform two synchronous RPCs on different remote processors in parallel with each other, the only mechanism available is to execute two parallel threads, each of which performs a synchronous RPC. However, using asynchronous RPCs CP can (in one thread) start two RPCs and wait for both to complete. As illustrated in FIG. 2D, at 60 CP signals $RP_1$ to execute function A ("do A") and signals $RP_2$ to execute function B ("do B"). Hence at 62 $RP_1$ begins execution of function A and at 64 $RP_2$ begins execution of function B. At 66 $RP_1$ completes execution of function A and signals this fact ("done A") to CP, which receives this message at 68 but continues to wait for the completion of function B. $RP_2$ completes execution of function B at 70, and signals this fact ("done B") to CP, which at 72 continues execution of its sequence of instructions. Hence it can be seen that asynchronous RPCs allow parallelism between processors.

Nevertheless, in practice asynchronous RPCs can be difficult for the programmer to use. Various asynchronous RPC libraries are known, but they all suffer from the problem of being hard to program. Some common errors include: suppressing the signalling of task completion, but still waiting for the task to complete; not suppressing the signalling of task completion and not waiting for the task to complete; writing too many RPC requests into a task queue of finite capacity; introducing a deadlock condition where the next RPC request on each of two different remote processors cannot start until it receives a signal indicating that the other RPC request has completed; and introducing race conditions where the behaviour of the program depends on the relative speeds of tasks running on different processors.

The IBM RPC library allows sequences of RPCs to be sent as one group. This reduces the inter-task latency associated with signalling and waiting identified above, but it cannot reduce inter-task latency when the RPCs execute on multiple processors. Furthermore it does not assist the programmer in avoiding the problems described above, such as the introduction of race conditions or omitting waits.

As such the programmer is typically faced with a choice between the simplicity and reliability of programming using synchronous RPCs and the performance benefits of using asynchronous RPCs.

Some discussions of the use of RPCs in the prior art can be found in the following: "Optimizing RPC", Sandler D., COMP 520, Sep. 9, 2004; "Lightweight RPC", Bershad B., Anderson T., Lazowska E., Levy H., 1990; and "Flick: A flexible, optimizing IDL compiler", Eide E., Frei K., Ford B., Lepreau J. and Lindstrom G., *ACM SIGPLAN* '97, pages 44-56, Las Vegas, Nev., June 1997.

U.S. patent application Ser. Nos. 11/976,314 and 11/976,315 discuss the programming of multiprocessor systems. Some background information on the analysis of dependencies in the compilation of program code for such systems can be found in Chapters 9.0 to 9.2 of "Advanced Compiler Design and Implementation", S. Muchnick, Morgan Kaufmann, 1997 and in "Conversion of control dependence to data dependence", Allen J., Kennedy K., Porterfield C. and Warren J., 10th ACM SIGACT-SIGPLAN Symposium on Principles of Programming Languages (Austin, Tex., Jan. 24-26, 1983), ACM, New York, N.Y., 177-189.

It would be desirable to provide an improved technique for programming multiprocessor systems, which combined the simplicity of programming with synchronous RPCs and the performance benefits of using asynchronous RPCs.

SUMMARY OF THE INVENTION

Viewed from a first aspect, the present invention provides a method of reducing inter-task latency for software comprising a sequence of instructions including a synchronous remote procedure call to be executed on a multiprocessor system, said multiprocessor system comprising a calling processor and at least one remote engine, the method comprising the steps of: inputting said software; inputting a runtime resource description, said runtime resource description describing a runtime environment of said multiprocessor system; identifying said synchronous remote procedure call in said sequence of instructions; replacing said synchronous remote procedure call in said sequence of instructions with an initiation instruction and a wait instruction to generate a substitute sequence of instructions; identifying dependencies between instructions in said substitute sequence of instructions; reordering said substitute sequence of instructions with reference to said runtime resource description and said dependencies to generate a reordered sequence of instructions; and outputting said reordered sequence of instructions.

According to the techniques of the present invention software may be written comprising a sequence of instructions which includes a synchronous remote procedure call, that software intended to be compiled for execution on a multi-processor system, and yet the reduced inter-task latency associated with the use of an asynchronous remote procedure call may be achieved. The multiprocessor system comprises a calling processor (also known as a control processor) from which the synchronous remote procedure call is to be called and at least one remote engine to execute the procedure thus remotely called. Note that the programmer is able to write program code which includes the easier-to-program synchronous remote procedure call.

According to the techniques of the present invention, a synchronous remote procedure call is identified in the sequence of instructions and replaced with an initiating instruction and a wait instruction to generate a substitute sequence of instructions. This pair of instructions corresponds in function to the synchronous remote procedure call, the initiating instruction causing the required task (the remote procedure) to be signalled to the remote engine on which it will execute, and the wait instruction causing the calling processor to wait until completion of that remote procedure is signalled. The method then further comprises identifying dependencies in the substitute sequence of instructions and reordering the substitute sequence of instructions with reference to a runtime resource description, which describes a runtime environment of the multiprocessor system, and with reference to the identified dependencies. This reordering of the sequence of instructions is performed to reduce inter-task latency when the software is executed on the multiprocessor system. The reordered sequence of instruction is then outputted ready to be compiled for execution on the multiprocessor system.

The inventor of the present invention realised that inter-task latency when executing software on a multiprocessor system could be reduced by taking advantage of asynchronous remote procedure call techniques, whilst still allowing the programmer the simplicity and transparency of writing software with a synchronous remote procedure call. Expanding the sequence of instructions into a substitute sequence of instructions in which the synchronous remote procedure call has been split up into an initiation instruction and a wait instruction allows a greater degree of freedom in the subsequent reordering of instructions, and hence inter-task latency can be more effectively reduced. The advantages of the present invention may be realised even when there is only one synchronous remote procedure call in the software, for example, when the software also comprises a FIFO instruction following a synchronous remote procedure call. The expansion of the synchronous remote procedure call into an equivalent initiation instruction and wait instruction allows a reordering in which the FIFO instruction comes between the initiation instruction and the wait instruction. This reordering is beneficial if the FIFO instruction is usually able to complete before the wait instruction completes, because it allows the FIFO instruction to execute in parallel to the remote procedure call, thus reducing inter-task latency.

In other embodiments said sequence of instructions includes a plurality of synchronous remote procedure calls, said identifying said remote procedure call step comprises identifying said plurality of synchronous remote procedure calls, and said replacing step comprises replacing each instruction of at least a subset of said plurality of synchronous remote procedure calls with a corresponding initiation instruction and wait instruction. To take a simple example, the software may include two synchronous remote procedures calls, and by replacing each synchronous remote procedure call with an equivalent initiation instruction and wait instruction, a reordering of the instruction sequence becomes possible which allows inter-task latency to be reduced, for example by scheduling the first and second initiation instructions to be sequential, followed by the wait instructions in sequence.

In some embodiments, the method further comprises a step of suppressing at least one wait instruction determined to be redundant following said reordering. In the above mentioned example, where the software includes at least two synchronous remote procedure calls and the initiation and wait instructions have been reordered such that the pair of wait instructions follows the pair of initiation instructions, the first of the wait instructions may be determined to be redundant. For example each wait instruction may be configured to comprise an argument indicating whether a "complete" signal is required when the remote procedure call completes. When two synchronous remote procedure calls are arranged in sequence, according to the techniques of the present invention, the first initiation instruction (corresponding to the first synchronous remote procedure call) may be chosen such that it is indicated that no "complete" signal is required when that remote procedure call has completed. Hence, the wait instruction corresponding to the first remote procedure call is no longer required, can be determined to be redundant and may be suppressed. This suppression could comprise removing that wait instruction from the sequence of instructions or could simply comprise marking it such that it will not be executed.

In some embodiments, the method further comprises a step of identifying at least two wait instructions, and reordering said at least two wait instructions to be adjacent to each other in said substitute sequence. In the situation where there are at least two synchronous remote procedure calls in the sequence of instructions, and hence after the replacing step there are then at least two wait instructions in the substitute sequence, subsequent handling of those wait instructions is simplified by reordering of the sequence of instructions such that the at least two wait instructions are adjacent to each other in the substitute sequence. This handling could take a number of forms, but according to one embodiment said reordering said at least two wait instructions is followed by a peepholing step in which adjacent instructions are examined. Peepholing represents an optimisation step which is advantageously straightforward to implement, comprising the comparison of adjacent pairs of instructions in the sequence of instructions.

It will be recognised that the multiprocessor system could be configured in a variety of ways, but in some embodiments the multiprocessor system comprises at least two remote engines and the method further comprises introducing signalling between said at least two remote engines. As discussed in the introduction, when a multiprocessor system comprises at least two remote engines, one source of inter-task latency may be the delay introduced by a first remote engine signalling to the calling processor that the first remote procedure call has completed, the calling processor handling this signal and instructing the second remote engine to begin its own remote procedure call. By introducing signalling between the at least two remote engines, it can be provided that completion of the first remote procedure call on the first remote engine may be directly signalled to the second remote engine, in order to initiate processing of the second remote procedure call. The inter-task latency is thus reduced, by avoiding the "round trip" back to the calling processor.

The signalling that may be introduced between at least two remote engines may take a variety of forms. In one embodiment, the signalling comprises task triggering signals. Thus, a first remote engine may send a signal to second remote engine to trigger a task on that second remote engine. In one embodiment, the signalling further comprises data provision. This data may result from a recently completed task on a first remote engine, and/or may comprise data required by a second remote engine for the processing task it has been given. In one embodiment, the signalling comprises an idle status notification, this idle status notification providing the remote engine receiving this signal with the information that the remote engine which sent the signal is currently idle. This idle status may result from the completion of a task, and in one embodiment the signalling comprises a task completion signal. Such a task completion signal may take a number of forms, but in one embodiment the task completion signal is specified by the calling processor. The ability for the calling processor to specify the task completion signal may be useful in a number of ways, for example it may be necessary to ensure the correct sequence of operations on the remote engines to distinguish between different situations in which one remote engine may signal to another. By specifying the task completion signal, the calling processor can ensure that the remote engine receiving that task completion signal can distinguish between different tasks or different time points at which a given task is completed. In a related manner, in one embodiment at least one remote engine is configured by said calling processor to begin a predetermined task on receipt of said task completion signal. In this way, the calling processor may also control which task a remote engine will be begin when it receives a particular task completion signal from another remote engine. In other embodiments, the task completion signal indicates completion of a predetermined number of tasks. For example a remote engine may be required to perform a number of tasks, and only on completion of all of those tasks to signal this fact to another remote engine. In embodiments of the present invention, the runtime resource description comprises a description of available signals between said at least two remote engines. This then facilitates the optimisation steps that may be performed to make use of inter-engine signalling.

When certain sequences of instructions are arranged for execution on a multiprocessor system, it may be the case that reordering that sequence of instructions may result in task interdependencies which could cause data hazards when at least a degree of parallelism is introduced. Accordingly, in one embodiment the reordering step further comprises identifying task interdependencies which could cause at least one data hazard when said software is executed on said multiprocessor system, and performing said reordering to avoid said at least one data hazard. Hence, the opportunity for data hazards to occur may be avoided, if task interdependencies are recognised and respected, when reordering instructions in the reducing inter task latency step.

In one embodiment, said at least one remote engine comprises a pending task queue configured to hold at least one indication of a pending task for subsequent execution by that remote engine and said initiation instruction is configured to place an indication of a pending task in said pending task queue. The provision of the pending task queue for a remote engine enables that remote engine to accept more than one task to perform, tasks still to be performed being queued in the pending task queue. The provision of a pending task queue for a remote engine provides a significant degree of flexibility for the multi-processor system. In particular, the ability to have the next task which a remote engine must perform already queued up whilst a current task is being performed means that delays between the execution of one task and next may be kept to a minimum, since such a remote engine does not need to signal completion of a first task to the calling processor and wait for allocation of a second task before it can begin processing that second task. It will be recognised that the pending task queue can take a variety of forms, but in one embodiment the pending task queue is a FIFO queue. In some embodiments, the at least one remote engine comprises a completed task queue configured to hold at least one indication of a task completed by that remote engine. According to this arrangement, when the remote engine completes a particular task it adds an indication of that completed task into its completed task queue. The ability to queue up indications of completed tasks in this manner means that the consequences of completing that task (e.g. signalling this completion to the calling processor, passing resulting data to another remote engine, etc) need not be actioned immediately and this adds a further degree of flexibility and configurability to the multi-processor system. It will be recognised that this completed task queue can take a number of forms, but in one embodiment it is a FIFO queue.

According to one embodiment the runtime resource description comprises a depth of said pending task queue, and said reordering is performed such that when said software is executed on said multiprocessor system a number of pending tasks queued in said pending task queue will not exceed said depth. Incorporating the depth of the pending task queue into the runtime resource description enables the optimisations performed, in particular the reordering step, to be performed taking this step into account such that the number of pending tasks that will be added to this pending task queue when the software is executed on the multiprocessor system will not exceed the depth of the pending task queue.

According to one embodiment the instructions each have an associated priority, and said reordering comprises positioning instructions having a higher priority before instructions having lower priorities to an extent allowed by inter-instruction dependencies. Amongst the many instructions to be executed on a multiprocessor system, it may be the case that certain instructions are more important than others, in the sense that they should be executed with minimal delay, whilst other instructions may be less time-critical. The importance of instructions can be parameterised by a priority associated with each instruction and in this embodiment when reordering instructions, instructions having a higher priority are positioned as early in the sequence of instructions as is possible, whilst still respecting inter-instruction dependencies. The priorities associated with the instructions may be fixed, but according to one embodiment the method further comprises a priority adjustment step, when at least one priority is adjusted. Incorporating the ability to adjust the priorities of instructions enables a further degree of flexibility, in which the priority of a given instruction may be adjusted, if it is established that this adjustment would improve the inter-task latency when the software is executed on the multiprocessor system, without altering the semantic meaning of the software. This priority adjustment may be performed for a number of reasons, but according to one embodiment the at least one priority is associated with a lower priority instruction upon which a higher priority instruction depends, and said priority adjustment step comprises raising said at least one priority associated with said lower priority instruction. It has been recognised that higher priority instructions may be held up by the fact that they depend on the outcome of lower priority instructions, and according to this embodiment such lower priority instructions are identified and may have their associated priority raised, in order to promote the execution of the higher priority instruction dependent there on.

When at least one remote engine in the multiprocessor system comprises a pending task queue, according to one embodiment the initiation instruction is a pending task queue entry acquisition instruction, and said replacing step further comprises introducing a pending task queue data release instruction. According to this embodiment, the initiation instruction is further split into a pending task queue entry acquisition instruction and a pending task queue data release instruction. Sub-dividing the initiation instruction in this manner allows a further degree of flexibility in the scheduling of instructions for execution and hence allows the inter-task latency to be further reduced. In the situation where the at least one remote engine in the multiprocessor system comprises a completed task queue, according to one embodiment the wait instruction is a completed task queue data acquisition instruction, and said replacing step further comprises introducing a completed task queue entry release instruction. Hence the wait instruction is further sub-divided into a task queue data acquisition instruction and a completed task queue entry release instruction. Sub-dividing the wait instruction in this manner brings a further degree of flexibility to the reordering and scheduling of instructions for execution on the multiprocessor and thus may allow inter-task latency to be further reduced.

It may be the case that the at least one remote engine comprises only a single pending task queue, but in some embodiments the at least one remote engine comprises sequential pending task queues. Similarly it may be the case that the at least one remote engine comprises only a single completed task queue, but in embodiments the at least one remote engine comprises sequential completed task queues. These sequential task queues bring a further degree of flexibility to the configuration of the system, allowing the remote engine to more efficiently handle pending and completed tasks. For example, if a remote engine has an associated pending task queue, but a further task queue is interposed between the calling processor and the remote engine, then the calling processor will still be able to release a task to be queued for the remote engine, by adding it to that further task queue, even if the task queue of the remote engine is currently full to capacity.

The runtime resource description with reference to which the reordering of the sequence of instructions is performed may take a variety of forms. In one embodiment the runtime resource description comprises a description of hardware available in the multiprocessor system, but in another embodiment the runtime resource description comprises a software controlled view of said hardware available in said multiprocessor system. Hence, the runtime resource description may be a direct representation of the hardware available in the multi processor system, or may be a partial view thereof under the control of software. For example it may be the case that particular hardware components, although physically existing in the system, may be hidden under software control. As another example, the hardware may only provide a two-entry queue, but software may implement a four-entry queue.

In one embodiment, the method further comprises reducing a number of interrupts that will be received by said calling processor when said software is executed on said multiprocessor system. As discussed above, remote procedure calls may have inherent delays due to the requirement to signal completion of the remote procedure call and waiting for that signal to arrive. In low level remote procedure call mechanism implementations, each signal may generate an interrupt, and the number of interrupts received by the calling processor may be a significant burden. Accordingly, reducing the number of interrupts that will be received by the caller processor can alleviate this burden and allow the calling processor to perform its operations more efficiently.

It may be the case that at least one synchronous remote procedure call is arranged only to be executed if a particular runtime condition is true. Accordingly, in one embodiment said identifying said at least one synchronous remote procedure call in said sequence of instructions further comprises determining if said at least one synchronous remote procedure call is only executed when a runtime condition is true; and said replacing each said at least one synchronous remote procedure call in said sequence of instructions with an initiation instruction further comprises introducing said runtime condition as an argument of said initiation instruction. Transforming the initiation instruction in this manner enables such synchronous remote procedure calls to be handled by the techniques of the present invention, despite their dependency on a given runtime condition.

It will be recognised that the multiprocessor system could be configured in a variety of ways. In one embodiment the at least one remote engine comprises a processor, whilst in other embodiments the at least one remote engine comprises a hardware engine. Various permutations are of course possible, for example multiple individual processors, a mixture of processors and hardware engines, dedicated hardware engines such as DMAs or analogue-to-digital converters (ADCs) and so on.

According to one embodiment, wherein said sequence of instructions includes a plurality of synchronous remote procedure calls and said identifying said remote procedure call step comprises identifying said plurality of synchronous remote procedure calls, said method further comprising a merging step after said identifying said remote procedure call step in which: at least two sequential remote procedure calls to single remote engine are merged into one remote procedure call to said single remote engine. Hence, when at least two remote procedure calls are identified, if these are arranged to be executed sequentially on a single remote processor, they can be replaced by one remote procedure call to that remote processor, in which the two or more tasks are merged into a unit which will be handled as a single remote procedure call, which will cause those two or more tasks to be sequentially executed on that remote processor.

Viewed from a second aspect, the present invention provides a computer-readable medium storing a program which when executed on a computer causes the computer to carry out a method of reducing inter-task latency for software comprising a sequence of instructions including a synchronous remote procedure call to be executed on a multiprocessor system, said multiprocessor system comprising a calling processor and at least one remote engine, the method comprising the steps of: inputting said software; inputting a runtime resource description, said runtime resource description describing a runtime environment of said multiprocessor system; identifying said synchronous remote procedure call in said sequence of instructions; replacing said synchronous remote procedure call in said sequence of instructions with an initiation instruction and a wait instruction to generate a substitute sequence of instructions; identifying dependencies between instructions in said substitute sequence of instructions; reordering said substitute sequence of instructions with reference to said runtime resource description and said dependencies to generate a reordered sequence of instructions; and outputting said reordered sequence of instructions.

Viewed from a third aspect, the present invention provides a data processing apparatus for transforming reducing inter-task latency for software comprising a sequence of instructions including a synchronous remote procedure call to be executed on a multiprocessor system, said multiprocessor system comprising a calling processor and at least one remote engine, the apparatus comprising: a software input configured to input said software; a runtime resource description input configured to input a runtime resource description, said runtime resource description describing a runtime environment of said multiprocessor system; an identification unit configured to identify said synchronous remote procedure call in said sequence of instructions; a replacement unit configured to replace said synchronous remote procedure call in said sequence of instructions with an initiation instruction and a wait instruction to generate a substitute sequence of instructions; an identification unit configured to identify dependencies between instructions in said substitute sequence of instructions; a reordering unit configured to reorder said substitute sequence of instructions with reference to said runtime resource description and said dependencies to generate a reordered sequence of instructions; and an output configured to output said reordered sequence of instructions.

Viewed from a fourth aspect, the present invention provides a data processing apparatus for reducing inter-task latency for software comprising a sequence of instructions including a synchronous remote procedure call to be executed on a multiprocessor system, said multiprocessor system comprising a calling processor and at least one remote engine, the apparatus comprising: software input means for inputting said software; runtime resource description input means for inputting a runtime resource description, said runtime resource description describing a runtime environment of said multiprocessor system; identifying means for identifying said synchronous remote procedure call in said sequence of instructions; replacing means for replacing said synchronous remote procedure call in said sequence of instructions with an initiation instruction and a wait instruction; identification means for identifying dependencies between instructions in said substitute sequence of instructions; reordering means for reordering said substitute sequence of instructions with reference to said runtime resource description and said dependencies to generate a reordered sequence of instructions; and output means for outputting said reordered sequence of instructions.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1A:
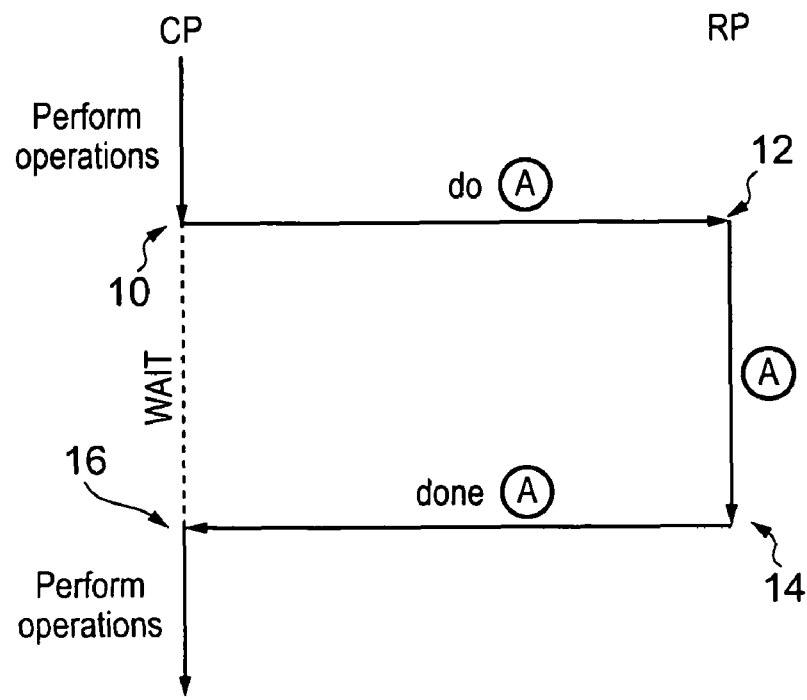
FIGS. 1A and 1B schematically illustrates the use of synchronous remote procedure calls according to the prior art.
Figure 1B:
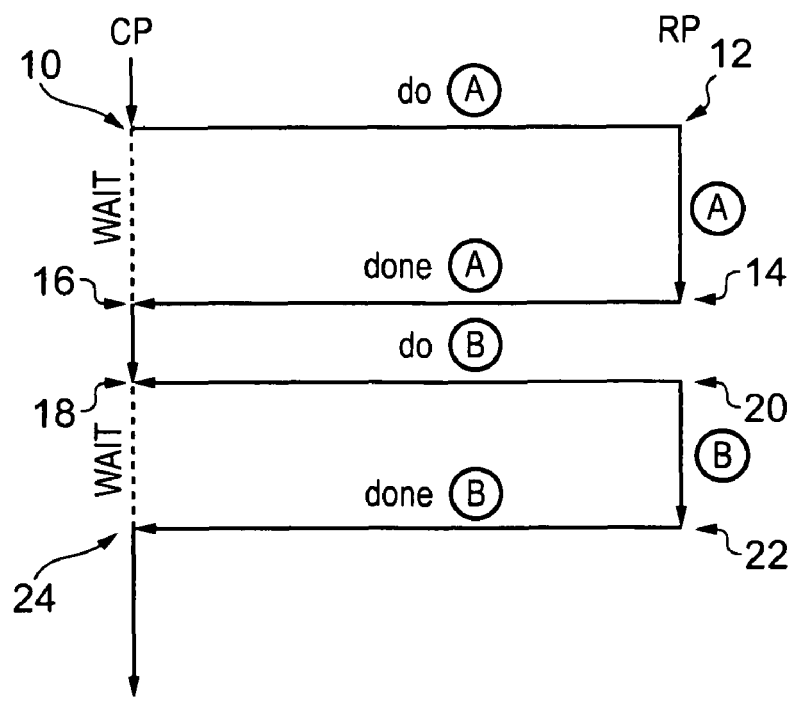
Figure 2A:
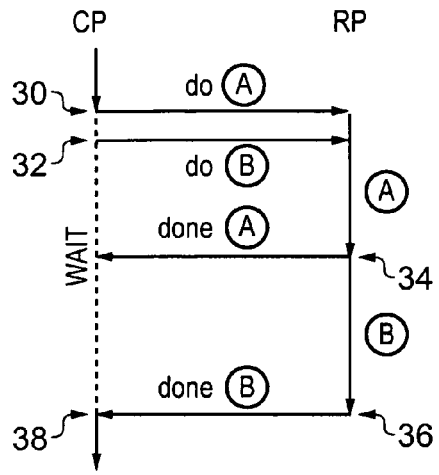
FIGS. 2A, 2B, 2C and 2D schematically illustrate the use of asynchronous remote procedure calls according to the prior art.
Figure 2B:
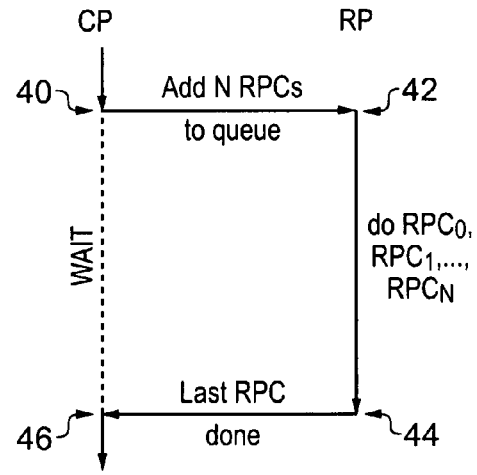
Figure 2C:
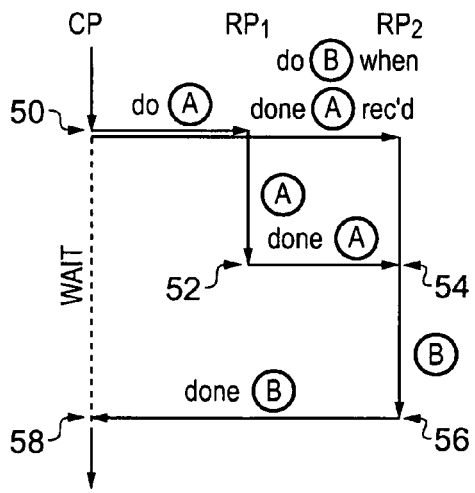
Figure 2D:
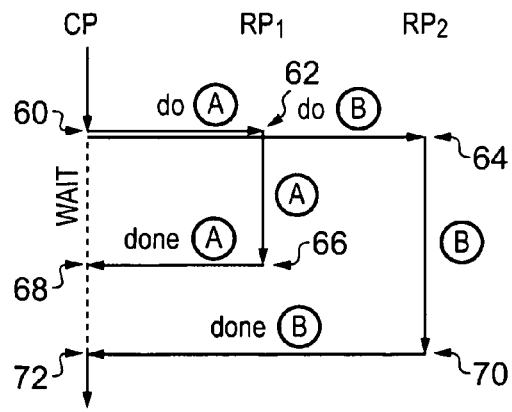
Figure 3:
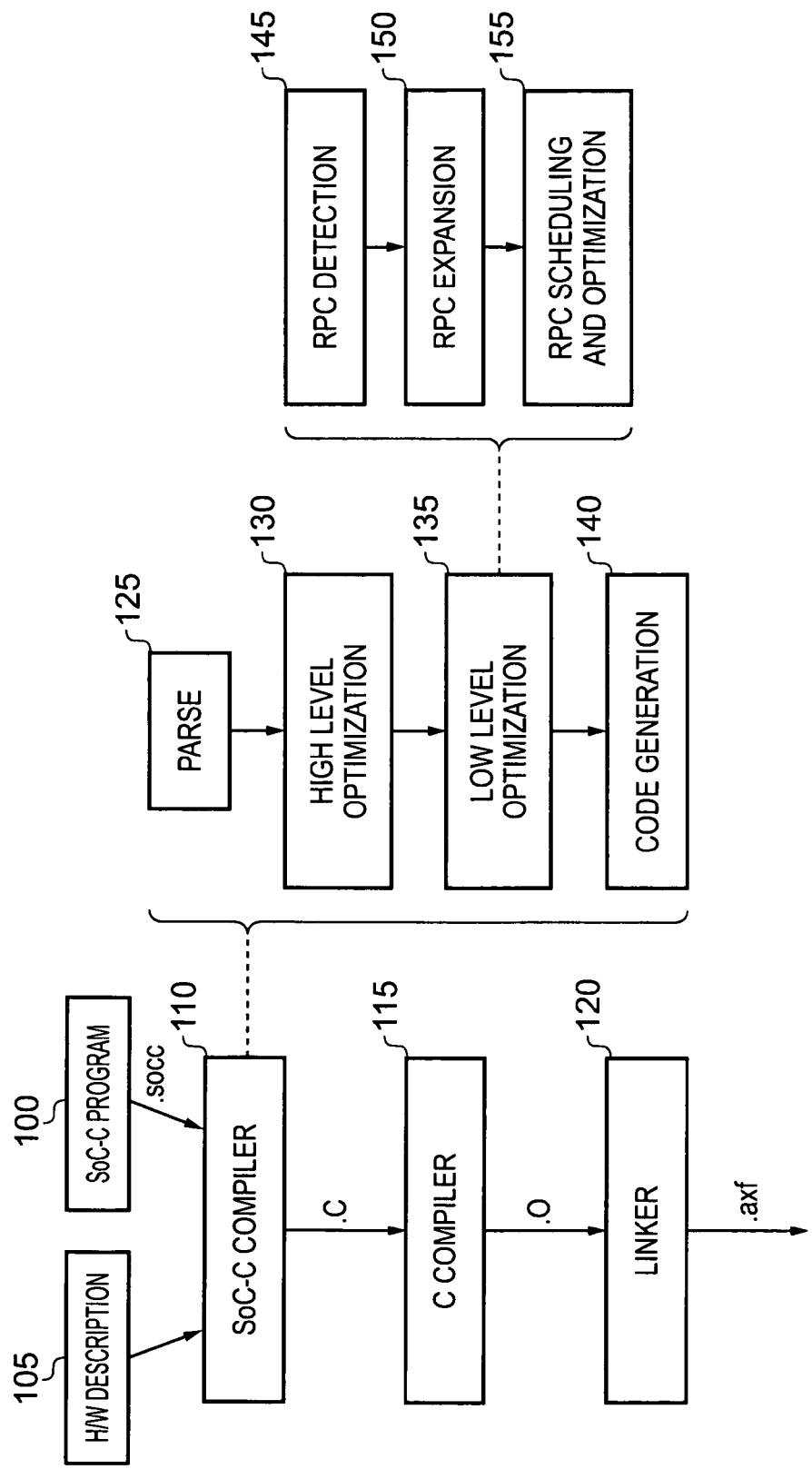
FIG. 3 schematically illustrates the compilation and linking of a source SoC-C program for execution on a multiprocessor system according to one embodiment.

FIG. 3 schematically illustrates the process by which a source SoC-C (System-on-Chip-C) program is compiled and linked for execution on a multiprocessor system. The SoC-C program 100 provides one input (in .socc format) to SoC-C compiler 110, whilst the other input is provided by the hardware description 105, which provides the compiler with information about the runtime configuration of the multiprocessor system on which the SoC-C program will ultimately be executed. This hardware description may be a true description of the hardware composing the system, or may be a software controlled view of the configuration of the system. This software controlled view can, for example, hide certain components of the system if they should not be used, or can alternatively present the compiler with information about components which, whilst appearing to be hardware components of the system for the purposes of compilation and execution, are in fact instantiated in software. The SoC-C compiler 110 transforms the SoC-C program 100 into a format (in this example .c format) suitable to input into C compiler 115. C compiler 115 compiles this transformed source code into an object file (in .o format) which is passed to linker 120. Linker 120 takes this object file and (with reference to one or more libraries as appropriate) generates an executable program (in this case in .axf format), which may be executed on the multiprocessor system.

The operation of the SoC-C compiler 110 may be conceptually broken down into the illustrated steps of parsing 125, high level optimisation 130, low level optimisation 135 and code generation 140. As illustrated in FIG. 3, the parse step 125 represents the initial step at which the input 100 and 105 are analysed to determine their structure with respect to predetermined rules of the languages in which they are written. Thus analysed, at step 130 various high level optimisations of the program may be carried out, for example the transformation of a sequential program into a program with multiple parallel program sections containing RPC calls which communicate via FIFO queues (as is described in U.S. patent application Ser. No. 11/976,315) or the transformation of a program for execution on a multiprocessor system where each processor may have a private memory (as is described in U.S. patent application Ser. No. 11/976,314). Thereafter at step 135 the SoC-C compiler 110 carries out various low level optimisations (described in more detail below) and finally at step 140 the revised program code is generated (in .c format) for passing to C compiler 115.

The low level optimisations at step 135 may, according to one embodiment, comprise the identification of remote procedure calls (RPCs) in the SoC-C program 100 which have been written by the programmer as synchronous RPCs and transforming them into asynchronous RPCs in a manner which will improve inter-task latency. Conceptually, the low level optimisation 135 may be broken down into stages. Firstly, at step 145 the synchronous RPCs are detected. Then at step 150 these synchronous RPCs are expanded (described in more detail below). Finally, at step 155 scheduling and optimisation of the RPCs is carried out (also described in more detail below).

Figure 4A:
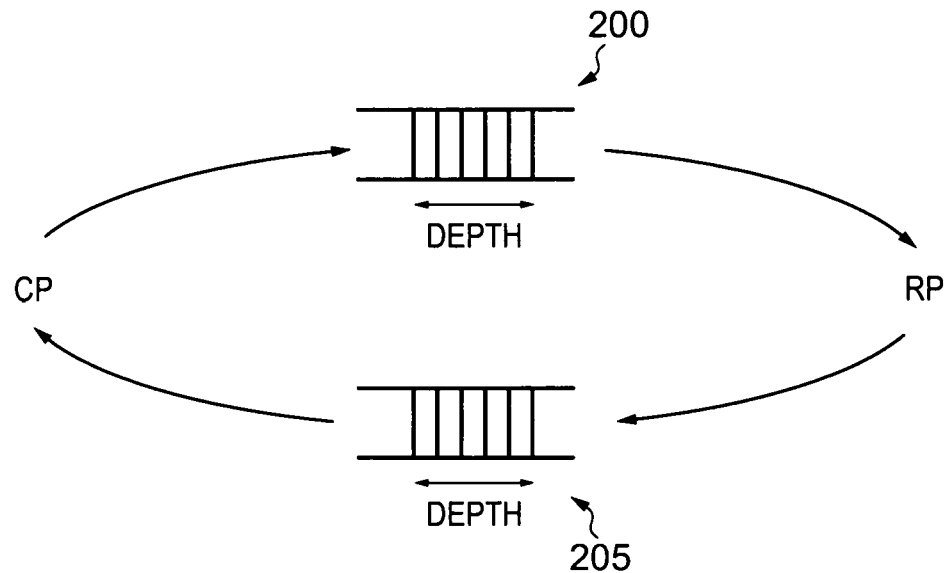
FIG. 4A schematically illustrates a calling processor and remote engine communicating via pending and completed task queues.
Figure 4B:
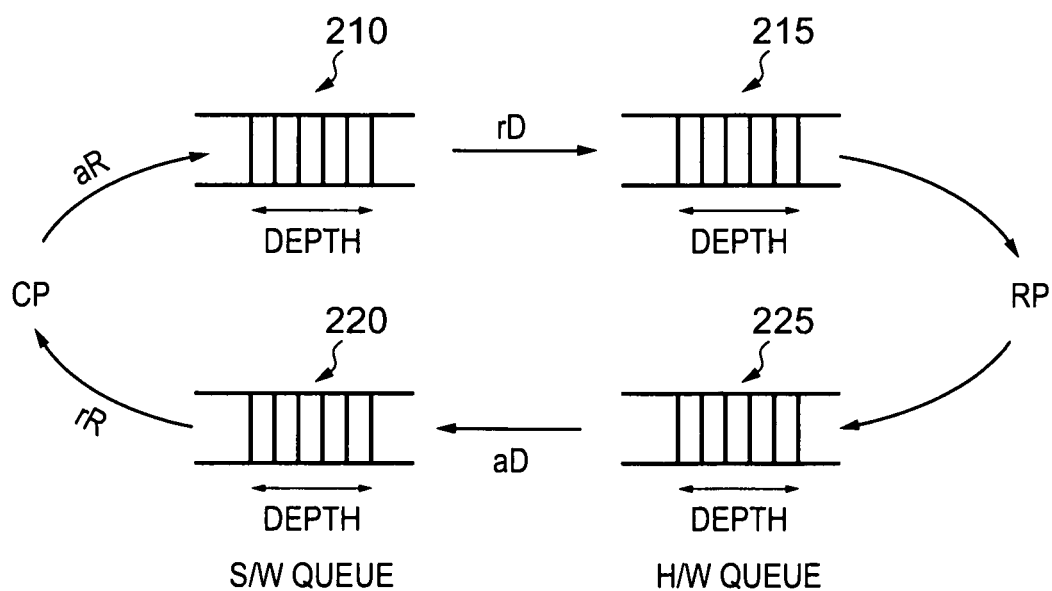
FIG. 4B schematically illustrates a calling processing and remote engine communicating via sequential pending task queues and sequential completed task queues.

Before the process of RPC detection, expansion and scheduling/optimisation is described in more detail, reference is first made to FIGS. 4A and 4B which schematically illustrate two configurations of task queues between a calling processor CP and a remote processor RP. CP and RP may also be referred to as a control processor and a remote engine, respectively, depending on their relative configurations. For example both CP and RP may be largely equivalent processors, or RP may be a hardware engine configured to perform certain tasks on behalf of CP. FIG. 4A schematically illustrates a configuration having a single pending task queue 200 and a single completed task queue 205. In the configuration illustrated in FIG. 4A task queues 200 and 205 may be considered to be associated with the remote processor RP, i.e. calling processor CP places tasks for RP to execute into RP"s pending task queue 200 and RP places indications of its completed tasks into its completed task queue 205. However, the configuration may also be considered to be more symmetrical, for example where CP and RP are equivalent processing units in the multiprocessor system. Note that both task queues 200 and 205 have an illustrated depth, which indicates the maximum number of tasks (or indications of tasks) which can be placed into each task queue. In some embodiments the optimisation steps carried out, for example the reordering of instructions, is performed with reference to the available task queue depths, such that the number of tasks that will end up being queued in a given task queue will not exceed the available depth of that task queue.

FIG. 4B schematically illustrates a configuration of sequential task queues. Task queue 200 in FIG. 4A has been replaced by task queues 210 and 215, whilst task queue 205 in FIG. 4A has been replaced by task queues 220 and 225. Note in particular that in the example configuration illustrated in FIG. 4B the task queues 210 and 220 are embodied in software, whilst (in this embodiment) the task queues 215 and 225 are embodied in hardware. Various permutations of hardware-only, software-only or a mix of hardware-software are possible in other embodiments are possible. The task queues of FIG. 4B can in principle be considered to be shared between CP and RP, or associated with only one of the two. For example, in the embodiment illustrated in FIG. 4B, the software queues 210 and 220 are associated with CP, whilst the hardware queues 215 and 225 are associated with RP. In other words, CP instantiates task queues 210 and 220 in software running on CP, whilst task queues 215 and 225 form part of the hardware of RP. According to this arrangement, the process of CP passing a task to RP for execution is formed of two stages. This means that a task descriptor (to be placed in a task queue) can be constructed some time before the task should actually be initiated, and the task is only initiated some time later.

Firstly, CP constructs a task in software pending task queue 210 ("RPC_acquireRoom aR"). This setting up of the task may take a relatively long time (e.g. 100 cycles). At this stage the task is not ready to be run, for example it may be dependent on the completion of another task that is currently running on another processor. Some time later it becomes safe (from a data hazard point of view) to run the task (for example, the other task on which it depends has completed). Then, at this point the (indication of) the task is transferred from software pending task queue 210 to hardware pending task queue 215 ("RPC_releaseData rD"), indicating to RP that the task is ready to be run. Similarly, the process by which RP signals a completed task to CP may broken down into two stages. Firstly the (indication of) the completed task in hardware completed task queue 225 is passed to software completed task queue 220 ("RPC_acquireData aD"). Secondly, the (indication of) the completed task is transferred from the software completed task queue 220 to CP ("RPC_releaseRoom rR").

A further advantage of this illustrated example of FIG. 4B is that the four queues can be efficiently implemented as a single circular buffer with four pointers into the buffer indicating the boundary between the four queues. In such an arrangement, transferring a task from one queue to another can be performed by merely incrementing a single pointer which might take 10 cycles.

Hence, splitting the pending task queue 200 in FIG. 4A into two separate queues 210 and 215 in FIG. 4B can be seen as another mechanism for reducing inter-task latency. With a single pending task queue (such as 200 in FIG. 4A), the task descriptor cannot be constructed until the task is ready to run. With two separate queues (such as 210 and 215 in FIG. 4B), it is possible to construct a task descriptor in advance and only transfer it into the pending queue 215 when any tasks it depends on have complete. This takes the 100 cycles taken to construct the task out of the critical path.

The process of RPC detection 145, RPC expansion 150 and RPC scheduling/optimization 155 schematically illustrated in FIG. 3 is now described in more detail.

An RPC can be split into 2 or more phases (the number depending on how detailed a level of scheduling optimization one wishes to be able to perform). The present discussion starts by considering an RPC split into two phases: initiating an RPC and waiting for the RPC to complete. Consider the following a sequence of code:

```
RPC(P,f);
RPC(P,g);
``` which indicates remote invocation of two functions "f" and "g" in order, both executing on a processor "P". Each RPC can be split into two phases: "RPC_put" (initiation) which puts an RPC request into P"s task queue and "RPC_get" (waiting) which waits for a response from "P". Rewriting the example code sequence using these operations gives:

```
RPC_put(P,f);
RPC_get(P,f);
RPC_put(P,g);
RPC_get(P,g);
```

Importantly it should be recognized that the following dependencies then exist between the four operations (where A→B should be read as "B depends on A"):

```
RPC_put(P,f); → RPC_get(P,f);
RPC_put(P,g); → RPC_get(P,g);
RPC_put(P,f); → RPC_put(P,g);
```

Since there is no dependency between the $2^{nd}$ and $3^{rd}$ operations, it is legal (i.e. it does not change the semantic meaning of the sequence of instructions) to reorder the operations. The field of instruction scheduling has developed many algorithms for optimizing sequences of dependent operations that typically work as follows: identify dependencies between operations; prioritize operations; generate a new sequence of operations by reordering operations such that high priority operations occur before lower-priority operations on which they do not depend. If RPC_put operations are given higher priority than RPC_get operations, such instruction scheduling yields the following sequence:

```
RPC_put(P,f);
RPC_put(P,g);
RPC_get(P,f);
RPC_get(P,g);
```

This reordering of the operations required to carry out the invocation of RPCs to perform functions f and g on processor P reduces the inter-task latency between functions f and g, in other words bringing the benefits of asynchronous RPC calls that were identified above.

When reordering operations, it is important to ensure that the data dependencies of the split RPCs reflect the data dependencies of the original RPCs. In one embodiment, this is handled as follows.

Suppose that RPC(P,f) reads a global variable 'r', writes a global variable 'w' and modifies a global variable 'm'. After splitting, both the RPC_put(P,f) and RPC_get(P,f) operations should be modelled as reading 'r' and modifying 'm', but they differ in their treatment of 'w'. RPC_put(P,f) is modelled as writing to 'w' while 'RPC_get(P,f)' is modelled as modifying 'w'. Treating RPC_get(P,f) as though it modifies 'w' ensures that 'w' is live throughout the period from when RPC_put(P,f) is initiated until when the RPC_get(P,f) completes.

It is also common for RPC operations to operate on data which is passed by reference. For example, we can write RPC(f,&x) to pass some variable 'x' to the RPC function 'f' (using the standard C notation of '&x' for variable 'x' being passed by reference). When optimizing program code involving RPCs, it is important to know whether an RPC function reads, writes or modifies any data buffers passed by reference. This might be accomplished by analyzing the implementation of the RPC function or it might be indicated by a programmer annotation.

When an RPC function RPC(P,f,&x) is split, it is important that both the RPC_put and RPC_get parts of the operation record that they read, write or modify 'x'. This is done by specifying '&x' in both the RPC_put and RPC_get calls. That is to say, the code:

```
RPC(P,f,&x);
``` is transformed into two calls:

```
RPC_put(P,f,&x);
RPC_get(P,f,&x);
```

If the original RPC function reads or modifies x, then the RPC_put and RPC_get operations are treated as though they read or modify 'x' respectively. On the other hand, if the original RPC function writes to 'x', then the RPC_put is treated as though it writes 'x' and the RPC_get operation is treated as though it modifies 'x'.

With these changes, it is possible then to track the dependencies in the same way that they are normally tracked in compilers (see, for example, Chapters 9.0-9.2 of "Advanced Compiler Design and Implementation", by S. Muchnick, Morgan Kaufmann, 1997). The reduction in inter-task latency resulting from replacing synchronous RPC calls, and subsequently reordering the substituted instructions, may even be realised when a particular sequence of code only comprises a single synchronous RPC. Consider the following code sequence:

```
RPC(P,f,&x);
fifo_acquireRoom(&q,&py);
``` which indicates remote invocation of function "f", executing on a processor "P" and the acquisition of an entry in a FIFO data queue 'q' by placing a pointer to the entry in variable 'py' (both 'q' and 'py' being passed by reference) (e.g. see the step aR acquiring an entry in task queue 210 in FIG. 4B). Performing the above-described expansion of the RPC call into its initiation and waiting phases yields:

```
RPC_put(P,f,&x);
RPC_get(P,f,&x);
fifo_acquireRoom(&q,&py);
```

Then performing the same reordering as described above, scheduling instructions according to priority whilst respecting the dependencies between the instructions, gives:

```
RPC_put(P,f,&x);
fifo_acquireRoom(&q,&py);
RPC_get(P,f,&x);
```

This reordering swaps two blocking operations (RPC_get and fifo_acquireRoom). This particular reordering is beneficial if the fifo_acquireRoom operation is usually able to complete before RPC_get completes, because it allows the fifo_acquireRoom call to execute in parallel to the RPC.

As noted above, synchronous RPC invocation has an overhead due to signalling completion of the RPC and waiting for that signal to arrive. Some asynchronous RPC mechanisms provide ways to suppress waiting for an RPC to complete. This is especially beneficial in low level RPC mechanisms where each signal generates an interrupt.

One way to do this is for the RPC_put operation to take an additional argument indicating whether a signal is desired. Whether the RPC_put operation supports signal suppression is indicated by the runtime resource description. When performing signal suppression, it is necessary for the RPC splitting step to keep track of corresponding operations, i.e. RPC_put and RPC_get operations that result from the splitting of a single original RPC operation. For example, an additional argument with values "NO_SIGNAL" or "WITH_SIGNAL" could be used. Returning to the example sequence of code discussed above, comprising RPC(P,f) and RPC(P,g), and introducing the argument "WITH_SIGNAL" to each RPC_put instruction, results in the following (reordered) code sequence:

```
RPC_put(P,WITH_SIGNAL,f);
RPC_put(P,WITH_SIGNAL,g);
RPC_get(P,f);
RPC_get(P,g);
```

Subsequently, a peephole optimization procedure may be carried out, which identifies sequences of adjacent "RPC_get" operations. Whenever such a sequence is found, all RPC_get operations except the last can be removed, and the RPC_put operations corresponding to the removed RPC_get operations have the "WITH_SIGNAL" argument changed to "NO_SIGNAL". In the present example, this produces the following code:

```
RPC_put(P,NO_SIGNAL,f);
RPC_put(P,WITH_SIGNAL,g);
RPC_get(P,g);
```

Thus amended, the waiting and signalling overhead associated with completion of the function f on remote processor P is avoided. Note that the transformation of code in this manner is described later with reference to FIGS. 5A (before) and 5B (after).

Programs written using synchronous RPCs on different remote processors often exploit multi-threading to express parallelism. For example, if fork join parallelism is expressed by writing two sections which execute in parallel, each of which performs an RPC call, an illustrative pseudo-code example might be:

```
PARALLEL {
    SECTION {
        RPC(P,f);
        RPC(P,g);
    }
    SECTION {
        RPC(Q,h);
        RPC(Q,i);
    }
}
``` wherein each SECTION executes in different thread, the first invoking functions f and g on remote processor P, and the second invoking functions h and i on remote processor Q and execution of statements following the parallel section only starting when both sections have completed execution.

Using the above-described approach of splitting the RPCs into two phases, identifying the dependencies between operations and scheduling the operations could result in various optimized sequences including the following:

```
RPC_put(P,NO_SIGNAL,f);
RPC_put(P,WITH_SIGNAL,g);
RPC_put(Q,NO_SIGNAL,h);
RPC_put(Q,WITH_SIGNAL,i);
RPC_get(P,g);
RPC_get(Q,i);
```

Consequently it is possible to obtain the parallelism benefits of asynchronous RPCs without the programming complexity.

In the optimizations described so far, the optimizations have exploited the fact that the task queue preserves dependencies between RPCs destined for the same processor. When programming heterogeneous parallel systems, it may be desired to perform one operation on a remote processor "P" and then to perform a dependent operation on a different remote processor "Q". In fact these inter-dependent operations could also be arranged to be performed on a homogeneous multiprocessor system, but a heterogeneous system, where P and Q have dedicated roles, is a more natural example.

In such a situation, one embodiment provides a way such that a first processor can send a signal to a second processor when a first RPC completes, and such that the second processor can wait for a signal before it starts a second RPC. This takes the form of an additional two arguments to every RPC_put, which specify a signal number to wait for and a signal number to signal (with "0" indicating not to send a signal or not to wait). The code is then optimized in the same way as before: it is rewritten, dependencies are calculated and the code is reordered.

However in this example, the further step is introduced that the reordered code is scanned, looking for places where an RPC_get on one processor is followed by an RPC_put on a different processor, where the first processor is capable of signalling to the second processor. If such a sequence is detected, the two RPC_put operations are changed so that the first RPC will send a signal to the second RPC, and the RPC_get is moved after the RPC_put. To illustrate this, consider the following example code sequence:

```
RPC(P,f);
RPC(Q,g);
```

This code sequence may then be transformed as described above, further incorporating the additional arguments indicating signalling capability, to give:

```
RPC_put(P,WITH_SIGNAL,0,0,f);
RPC_get(P,f);
RPC_put(Q,WITH_SIGNAL,0,0,g);
RPC_get(Q,g);
```

It is worth noting that, since the RPC operations are performed on two different remote processors, this transformation is not able to reorder the operations and inter-task latency has not yet been reduced. However, since the $2^{nd}$ and $3^{rd}$ operations are an RPC_put and an RPC_get, the code sequence may be rescheduled to the following:

```
RPC_put(P,WITH_SIGNAL,0,1,f);
RPC_put(Q,WITH_SIGNAL,1,0,g);
RPC_get(P,f);
RPC_get(Q,g);
``` which causes processor P to send signal "1" when the "f" RPC completes and processor Q to wait for signal "1" before it starts the "g" RPC. Note that this example assumes that the runtime resource description indicates that remote processor P is capable of sending signal '1' and that remote processor Q is capable of receiving signal '1'. For example, the runtime resource description might contain for each processor a list of the signals that that processor is capable of sending and a list of the signals that that processor is capable of receiving.

As the compiler transforms the sequence of instructions, it must keep track of which signals are currently in use and which may be safely reused. In one embodiment, this may be done by scanning the sequence of instructions in order from the start of the sequence keeping track of the (initially empty) set 'S' of signals currently in use. If two adjacent instructions are an RPC_get on a processor P1 followed by an RPC_get on a different processor P2 then the following steps are performed:

1) scan the runtime resource description and make a list L of all signals which can be signalled by processor P1 and received by P2;

2) remove from L those signals that are already in use;

3) select one signal 's' from the set L;

4) transform the adjacent instructions as described above; and 5) add 's' to the set 'S'

Of course, other embodiments may track when a signal is no longer in use (i.e. after the corresponding RPC_get operation), so that signals may be used multiple times within a sequence. Other embodiments may also allocate signals in a more sophisticated way. For example, if profile information is available, it is possible to prioritize those situations which will most benefit from this optimization and to perform the optimization in descending priority order.

Returning to the example code sequence above, the optimizations to suppress waiting for task completion can then also be applied, which gives:

```
RPC_put(P,NO_SIGNAL,0,1,f);
RPC_put(Q,WITH_SIGNAL,1,0,g);
RPC_get(Q,g);
```

Hence, as can be seen in this example, the techniques of the present invention have allowed the reduction of the signalling and waiting overhead, even though the operations are performed on two remote processors instead of a single processor.

Programs written using parallel sections often have dependencies where the start of one task depends on completion of two or more previous tasks or where the completion of two or more previous tasks triggers the start of a subsequent task. In this case, it is desirable for the processors to directly signal each other when tasks complete and for the compiler to transform the code to exploit this capability. For example, in this example sequence of code:

```
RPC(R,e);
PARALLEL {
    SECTION {
        RPC(P,f);
        RPC(P,g);
    }
    SECTION {
        RPC(Q,h);
        RPC(Q,i);
    }
}
RPC(R,j);
``` it is desired that completion of 'RPC(R,e)' will send signals to trigger the start of 'RPC(P,f)' and 'RPC(Q,h)', and it is desired that completion of 'RPC(P,g)' and of 'RPC(Q,i)' trigger the start of 'RPC(R,j)'. This signalling can be performed by further extending the RPC mechanism to specify a set of signals that should be sent when a task completes (instead of only sending a single signal as described above). In the following '{1,2}' indicates the set consisting of signals '1' and '2'. In practice, this would normally be represented by a bitset such as '6' which, when viewed as a binary number, has bits '1' and '2' equal to '1'. Using these sets, the desired code is as follows:

```
RPC_put(R,NO_SIGNAL,{ },{1,2},e);
RPC_put(P,NO_SIGNAL,{1},{ },f);
RPC_put(P,NO_SIGNAL,{ },{3},g);
RPC_put(Q,NO_SIGNAL,{2},{ },h);
RPC_put(Q,NO_SIGNAL,{ },{4},i);
RPC_put(R,WITH_SIGNAL,{3,4},{ },j);
RPC_get(R,j);
```

In order to implement this transformation requires the following changes to what has been described above:

1) Extend the RPC_put operations to use sets of signals for those processors that support use of sets of signals. The runtime resource description needs to be capable of specifying the restrictions on which sets of signals can be used by each processor. For example, using the bitset representation described above, the runtime resource description might indicate that some processors cannot use sets of signals and it may indicate that other processors can use sets of signals which are represented by a 32-bit bitset.

2) Extend the previously described reordering process to form sets of signals when transforming an RPC_get followed by an RPC_put. That is, the sequence:

```
RPC_put(P1,WITH_SIGNAL,S1,F1, ... );
...
RPC_get(P1,F1);
RPC_put(P2,WITH_SIGNAL,S2,F2, ... );
``` where the first 'RPC_put' and the first 'RPC_get' correspond to each other (i.e. are the result of splitting a single RPC operation) and where 'S1', 'S2', 'F1' and 'F2' are sets of signals, can be transformed to:

```
RPC_put(P1,WITH_SIGNAL,S1,addset(s,F1), ... );
...
RPC_put(P2,WITH_SIGNAL,addset(s,S2),F2, ... );
RPC_get(P1,F1);
``` where the signal 's' is not currently in use and 'addset(a,B)' returns the result of adding a signal 'a' to a set of signals 'B', and the processor P1 is capable of signalling the set 'addset(s,F1)' when a task completes and the processor P2 is capable of delaying the start of a task until all signals in the set 'addset(s,S2)' have been received. This transformation can be performed by a linear scan through a sequence of instructions while tracking which signals are currently in use.

3) Having introduced signals, adjacent 'RPC_get' operations and their associated signals can be suppressed as previously described. In the optimizations performed so far, the RPCs must occur in a single basic block for the optimization to be effective—that is, the operations must not have any branching operations (or branch targets) between them. This prevents optimization of code sequences such as:

```
RPC(P,f);
if (e) RPC(P,g);
``` in which the RPC(P,g) is conditional on "e" being true at runtime. In order to be able to apply the above described optimisation techniques to such code, the RPC API is extended with a flag indicating whether the RPC should be performed, such as:

```
RPC(P,true,f);
RPC(P,e,g);
```

Having performed this transformation (a variant on "if-conversion"—see "Conversion of control dependence to data dependence", Allen J., Kennedy K., Porterfield C. and Warren J., 10th ACM SIGACT-SIGPLAN Symposium on Principles of Programming Languages (Austin, Tex., Jan. 24-26, 1983), ACM, New York, N.Y., 177-189, the code can be transformed as described above. The same principle may also be applied to loops.

When optimizing a long sequence of RPC calls, the above-described optimisations can result in long sequences of RPC_put operations. Up to a certain point, this is beneficial, but as the sequence gets longer, the benefit is diminished and some disadvantages appear. This is due to the fact that each task queue entry requires some resource to store it—a given remote processor will not have an unlimited ability to queue up pending tasks. If the queue becomes full, the thread will block which can introduce deadlock. In fact, typically the most beneficial rearrangement has been found to be one where the sequence is arranged such that the queue always has two tasks in it, i.e. the sequence: put; get; put; get; put; get; put; get; being transformed into the sequence: put; put; get; put; get; put; get; get; since this eliminates most of the inter-task latency. Increasing the number of tasks in the queue beyond that is only beneficial if a) it allows more interrupts to be suppressed; or b) some of the tasks are very short and the remote processor is able to complete them before the control processor has been able to insert another task into the task queue.

Also, in a cooperatively scheduled multithreaded system, it is important that each thread frequently performs operations that can perform a context switch to another thread so that all runnable threads are able to make progress at the same rate. In a cooperatively scheduled multithreaded system where RPC_get operations perform context switches but RPC_put operations do not perform context switches, a long sequence of RPC operations could be transformed into a long sequence of RPC_put operations (which do not perform context switches) followed by a long sequence of RPC_get operations, which could have a detrimental effect on real-time performance of the system. ""

In order to address this situation, the transformation of code sequences may be augmented as follows. As well as adding dependencies representing data dependencies, the amount of space required in the task queue of each processor may be analysed. Then, anti-dependencies from an earlier operation to a later operation may be added if the first operation releases some resource that the second operation requires, and if the second operation could exceed that resource if the second operation were performed before the first operation. It is possible to detect the anti-dependencies before the reordering is performed by exploiting the fact that the total number of entries in the queues 200 and 205 (in FIG. 4A) is equal to the number of RPC_get operations performed on that processor minus the number of RPC_put operations performed on that processor, and further by exploiting the fact that the transformation never reorders two RPC_put operations on the same processor or reorders two RPC_get operations on the same processor. These two facts allow the assignment of two numbers to each RPC_get or RPC_put operation on some processor 'P' in each sequence of operations being transformed:

1) The number of RPC_get operations on 'P' up to and including this operation; and
2) The number of RPC_put operations on 'P' up to and including this operation.

This allows the determination as to whether to add an anti-dependency from an RPC_put operation on a processor 'P' with #RPC_put=p1 to an RPC_get operation on the same processor 'P' with #RPC_get=g2 as follows:

1) Let 'd' be the maximum of the size of queue 200 on processor 'P' and of the size of queue 205 on processor 'P';
2) If 'p1−g2>d' then an anti-dependency should be added from the RPC_put operation to the RPC_get operation.

The reordering of the instruction sequence is then modified such that it respects both the dependencies and the anti-dependencies.

The cost of creating a task queue entry can be significant and it is desirable to set up the RPC, even if the RPC cannot yet be started due to task queue capacity or because it depends on another task that has not yet completed. To handle this, the RPC_put operation can be further split into the "acquire Room" (aR) and "release Data" (rD) phases, discussed above with reference to FIG. 4B. Thus subdivided further opportunities for rescheduling, and hence reduction of inter-task latency, arise. This is performed by further splitting 'RPC_put' operations into two operations 'RPC_acquireRoom' and 'RPC_releaseData', and splitting 'RPC_get' operations into two operations 'RPC_acquireData' and 'RPC_releaseRoom' as shown:

---

RPC(P,f);
split into →
    RPC_put(P,f);
    RPC_get(P,f);
split into→
    RPC_acquireRoom(P,f);
    RPC_releaseData(P,f);
    RPC_acquireData(P,f);
    RPC_releaseRoom(P,f);

---

The meaning of the four operations is as follows:

RPC_acquireRoom creates a task in the queue 210. This task is not yet visible to the remote processor so the task cannot yet be started by the remote processor.

RPC_releaseData moves a task from the head of queue 210 to the tail of queue 215. This makes the task visible to the remote processor and it can start when it reaches the head of queue 210.

RPC_acquireData waits until there is a completed task in queue 225 and moves it to queue 220. This makes the task results visible to the control processor.

RPC_releaseRoom removes a completed task from queue 220. This frees the space used by the task results.

When reordering programs using these operations there are dependencies between corresponding operations (i.e. between operations introduced by splitting a single RPC operation). If the queues have a limited capacity, anti-dependencies are additionally added between non-corresponding RPC operations in order to ensure that the capacity of queues 210, 215, 220 and 225 cannot be exceeded. These anti-dependencies are determined in a similar way to that described above for the two-queue system.

In one embodiment, the runtime resource description specifies four numbers:

A: the depth of queue 210;
B: the maximum of the depths of queues 215 and 225;
C: the depth of queue 220; and
D: the total number of entries in all four queues.

For each processor P and for each RPC operation 'o' on P in a sequence of operations, the following are calculated:

aR(P,o): the number of 'RPC_acquireRoom(P, ... )' operations up to and including this RPC operation in the sequence;

rD(P,o): the number of 'RPC_releaseData(P, ... )' operations up to and including this RPC operation in the sequence;

aD(P,o): the number of 'RPC_acquireData(P, ... )' operations up to and including this RPC operation in the sequence; and rR(P,o): the number of 'RPC_releaseRoom(P, ... )' operations up to and including this RPC operation in the sequence.

For any pair of RPC operations 'o1' and 'o2' on some processor 'P' in a sequence of operations where 'o1' occurs before 'o2', there is an anti-dependency from 'o2' to 'o1' if any of the following four conditions is true:

--- aR(P,o2) - #rD(P,o1) > A
rD(P,o2) - #aD(P,o1) > B
aD(P,o2) - #rR(P,o1) > C
aR(P,o2) - #rR(P,o1) > D

---

For example, suppose the runtime resource description for remote processor 'P' is 'A=1, B=1, C=1, D=4', then the following sequence of RPC operations:

---

RPC(P,f);
RPC(P,g);
RPC(P,h);

--- can be split into the following sequence of operations:

---

RPC_acquireRoom(P,f);
RPC_releaseData(P,f);

```
RPC_acquireData(P,f);
RPC_releaseRoom(P,f);
RPC_acquireRoom(P,g);
RPC_releaseData(P,g);
RPC_acquireData(P,g);
RPC_releaseRoom(P,g);
RPC_acquireRoom(P,h);
RPC_releaseData(P,h);
RPC_acquireData(P,h);
RPC_releaseRoom(P,h);
``` and then reordered into the following sequence of operations:

```
RPC_acquireRoom(P,f);
RPC_releaseData(P,f);
RPC_acquireRoom(P,g);
RPC_acquireData(P,f);
RPC_releaseData(P,g);
RPC_releaseRoom(P,f);
RPC_acquireRoom(P,h);
RPC_acquireData(P,g);
RPC_releaseData(P,h);
RPC_releaseRoom(P,g);
RPC_acquireData(P,h);
RPC_releaseRoom(P,h);
```

The sequence prior to reordering suffered from high latency between tasks because the task descriptor is not constructed (using RPC_acquireRoom) until after the previous task completes (i.e. after RPC_acquireData returns) and because the action of constructing a task descriptor is relatively slow. The sequence after reordering reduces the latency between tasks because it constructs task descriptors as early as possible and because it makes tasks visible to the remote processor (by calling RPC_releaseData) as soon as there is space in the remote processor's queue (i.e. immediately after RPC_acquireData).

Splitting RPC operations into four separate operations has a further advantage, in that it allows optimization of a FIFO operation followed by a dependent RPC operation. For example, the following sequence of code:

```
fifo_acquireData(&q,&py);
RPC(P,f,py);
``` requires that the address of the data buffer returned from the FIFO is available before the RPC_put can be performed. The latency associated with creating the task descriptor can be eliminated if the RPC operation is split into four operations (as described above) and the fifo_acquireData is split into two operations: 'fifo_acquireDataBuffer' (which calculates the address of the next data buffer that will be used) and 'fifo_waitData' (which waits until that buffer contains valid data). This then gives:

```
fifo_acquireDataBuffer(&q,&py);
fifo_waitData(&q);
RPC_acquireRoom(P,f,py);
RPC_releaseData(P,f,py);
RPC_acquireData(P,f,py);
RPC_releaseRoom(P,f,py);
```

This sequence is then transformed as described above by scheduling instructions according to priority, while respecting the dependencies between the operations:

```
fifo_acquireDataBuffer(&q,&py);
RPC_acquireRoom(P,f,py);
fifo_waitData(&q);
RPC_releaseData(P,f,py);
RPC_acquireData(P,f,py);
RPC_releaseRoom(P,f,py);
```

This reordered sequence reduces the latency between when the data becomes available in the FIFO and when the dependent task 'f' starts. This same approach can be used for any operation which blocks execution of the thread until some data is available but where the address of the data buffer can be determined (and therefore used to construct a task descriptor) before the buffer contains data. For example, an Analogue to Digital Convertor (ADC) which writes data into a circular buffer may behave in this way.

Figure 5A:
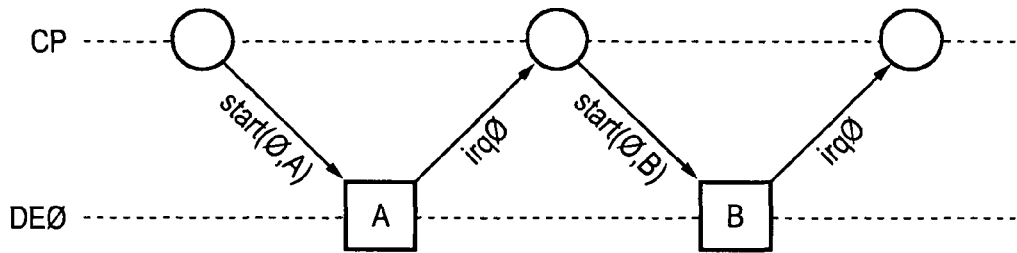
FIGS. 5A, 5B and 5C schematically illustrate different communication patterns between a calling processor and a remote engine executing two tasks.
Figure 5B:
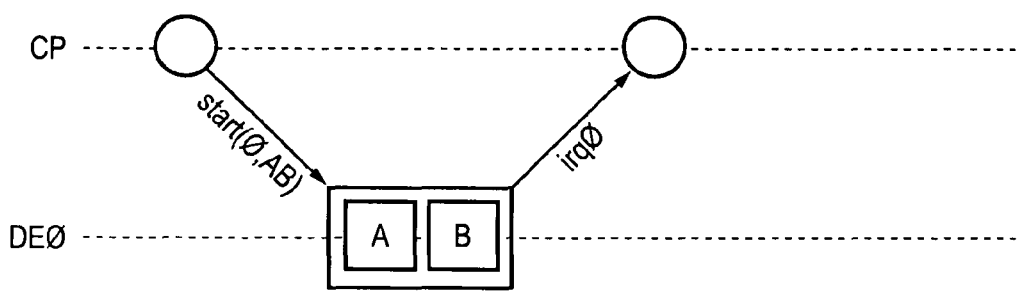
Figure 5C:
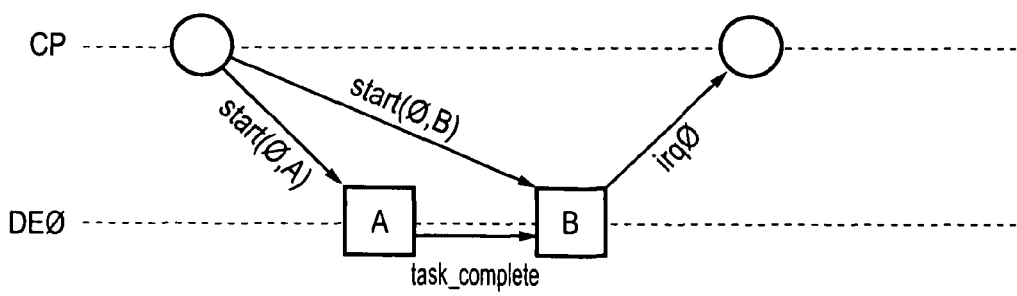

FIGS. 5A, 5B and 5C schematically illustrate various configurations of communication between control (i.e. calling) processor CP and a (remote) data engine DE0. In FIGS. 5A-C there are two tasks A and B which CP requires DE0 to perform. FIG. 5A schematically illustrates a configuration wherein CP causes task A and B to be executed by DE0 using a synchronous RPC mechanism. The sequence of events is as follows: CP triggers the execution of task A on DE0 by sending the signal start(0,A) to DE0; DE0 signals the completion of task A to CP via the interrupt request irq0; having thus been notified of the completion of task A, CP triggers the execution of task B on DE0 by sending the signal start(0,B); and once task B has completed, DE0 signals this fact to CP via interrupt request irq0. It will be recognised that there is significant inter-task latency between tasks A and B due to the time required for the interrupt request irq0 to be sent from DE0 to CP, to be processed by CP and for the signal start(0,B) to be sent from CP to DE0. This series of communications between CP and DE0 represents the communication pattern that would be carried out if the remote procedure calls for task A and task B were allowed to execute in this multiprocessor system in the synchronous manner in which they were programmed by the system programmer.

However, according to the techniques of the present invention the synchronous RPCs programmed by the system programmer may be transformed such that a communication pattern between CP and DE0 such as is illustrated in FIG. 5B or FIG. 5C may result. According to the situation in FIG. 5B, tasks A and B have been merged into a single merged task which is executed in response to the signal start(0,AB) from CP. The merging of tasks A and B may be implemented via a peephole optimization step, which looks for adjacent RPC operations which may be merged into a single operation. Typically this step would be performed prior to any splitting of RPC operations—indeed a single RPC operation formed by the merger of two originally separate RPC operations could of course itself if subject to the RPC splitting techniques described above. This merging process is performed with reference to the runtime resource description, since some types of remote processor cannot merge independent tasks (e.g. a DMA controller cannot). The completion of this merged task is signalled by the interrupt request irq0. This task execution arrangement for tasks A and B typically reduces the inter-task latency to less than 10 cycles. This is to be compared to a typically inter-task latency of 100-200 cycles for the communication pattern illustrated in FIG. 5A. FIG. 5C schematically illustrates a communication pattern for CP and DE0 in which tasks A and B are chained together. This is implemented by tasks A and B being queued in a task queue of DE0 (set up by CP sending signal start(0,A) and signal start(0,B)), the completion of task A signalling (internally within DE0) that a further task may now be executed ("task_complete"). On completion of task B, DE0 signals this fact to CP via interrupt request irq0.

Figure 6A:
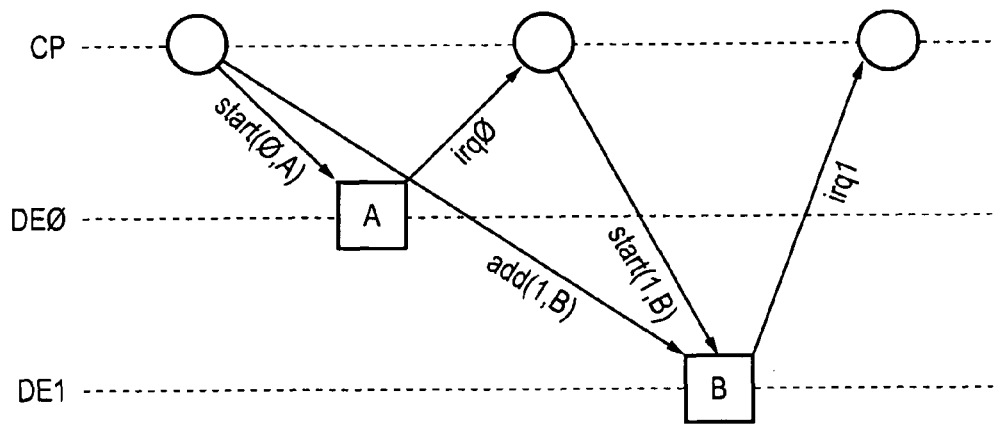
FIGS. 6A and 6B schematically illustrate different communication patterns between a calling processor and two remote engines each having a task to execute.
Figure 6B:
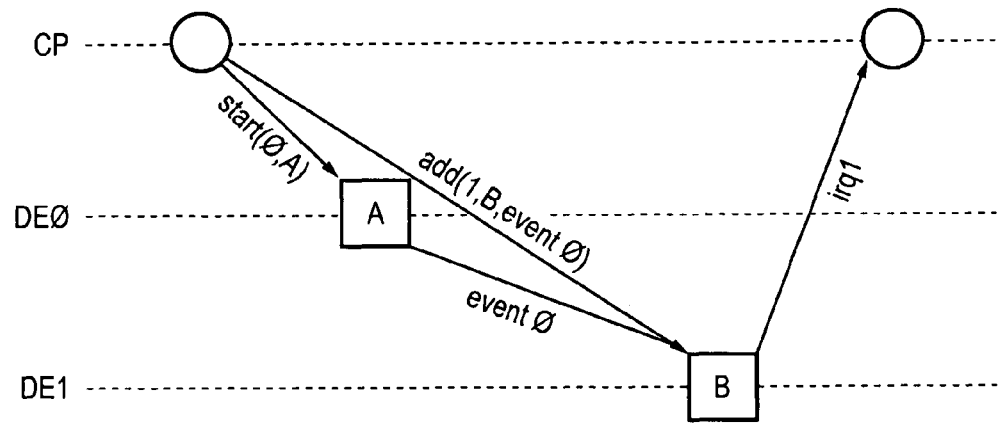

FIGS. 6A and 6B schematically illustrate some more complex communication patterns in a multiprocessor system comprising control (calling) processor CP and two data engines (i.e. remote engines) DE0 and DE1. FIG. 6A schematically illustrates the communication pattern that would result from the execution of the two synchronous RPCs as programmed by the system programmer. CP initiates the execution of task A on DE0 with signal start(0,A) and also adds task B to the task queue of DE1 using the signal add(1, B). On completion of task A, DE0 signals this fact to CP via interrupt request irq0. CP then initiates task B on DE1 using the signal start(1,B). DE1 signals the completion of task B using interrupt request irq1. FIG. 6B schematically illustrates the communication pattern that results when the synchronous RPCs of FIG. 6A are transformed into one possible asynchronous RPC configuration. In this configuration CP initiates task A on DE0 and also adds task B to the pending task queue of DE1, further specifying that this task should be executed on receipt of the signal event0, by means of the signal add(1,B, event0). Thus, once task A has completed on DE0, the signal event0 from DE0 triggers the execution of task B on DE1. Once DE1 has completed task B it signals this fact to CP via interrupt request irq1. In other example communication patterns, a signal from one data engine to another may be used to signal that the first data engine is idle (and hence available to be sent a task). In the example of FIGS. 6A and 6B, for clarity of illustration, the tasks A and B are shown as single tasks, but each could also represent a sequence of tasks, and signals such as event0 from DE0 to DE1 can be used to indicate the completion of a predetermined number of tasks.

Figure 7:
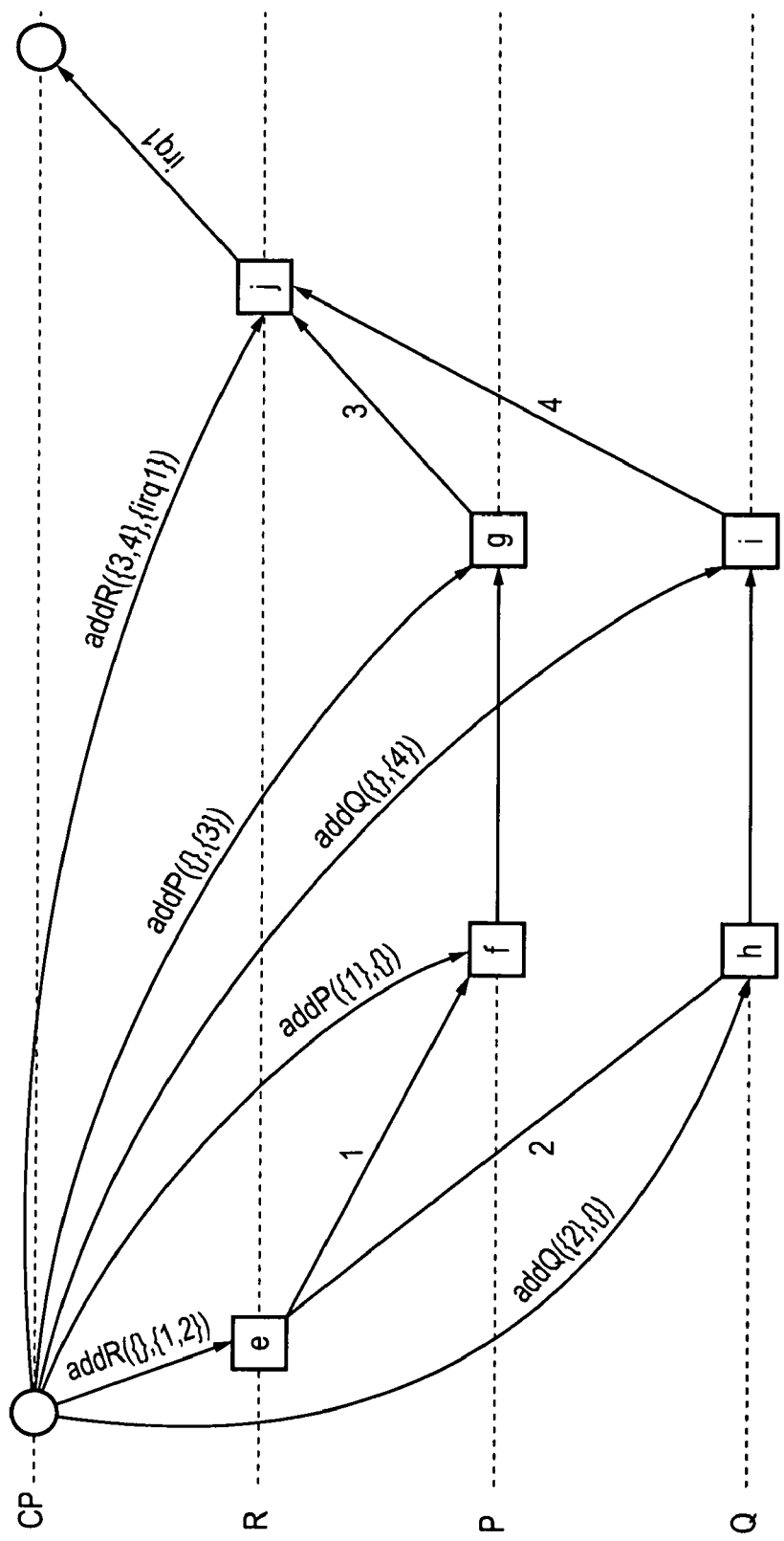
FIG. 7 schematically illustrates communication in a multiprocessor system.
Figure 8:
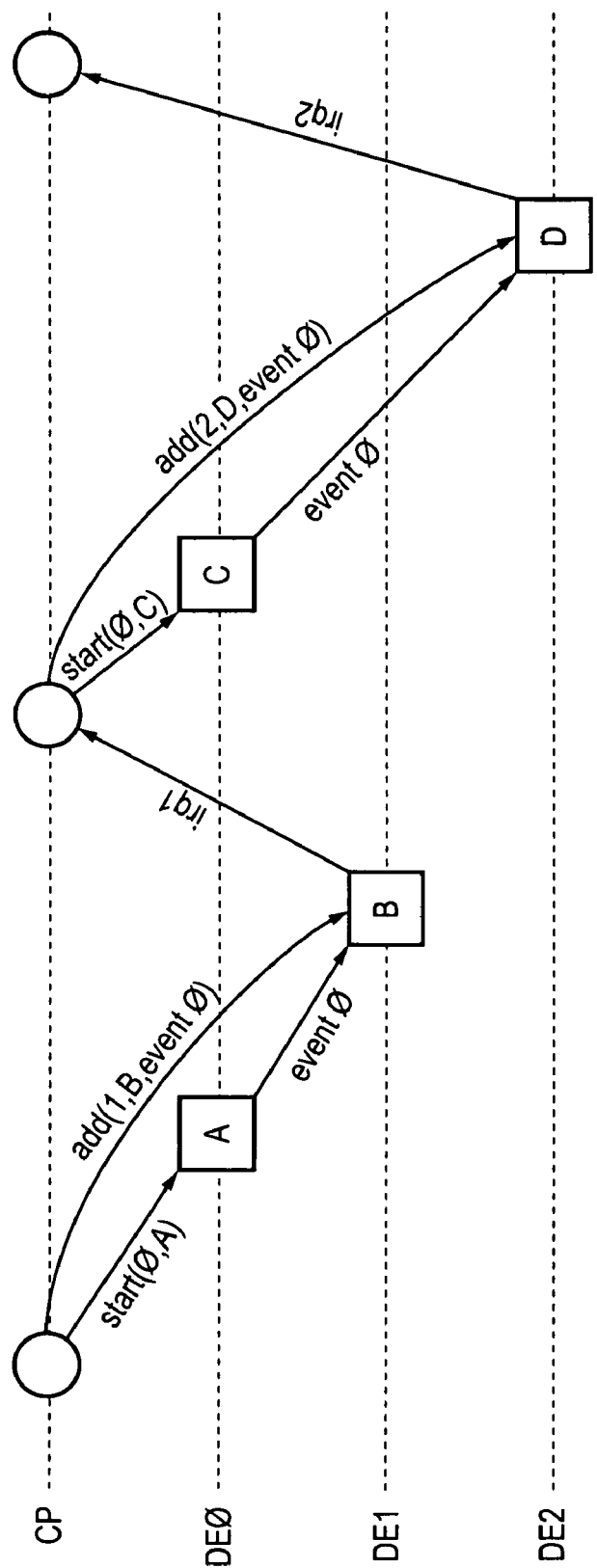
FIG. 8 schematically illustrates communication in a multiprocessor system.

FIGS. 7 and 8 schematically illustrate some more complex multiprocessor systems, and the communication patterns that may be the result of the optimisation techniques of the present invention. FIG. 7 schematically illustrates a multiprocessor system comprising control (i.e. calling) processor CP and remote engines R, P and Q. Viewed sequentially, R is required to perform 'e', on completion of which P should perform 'f' then 'g' and Q should perform 'h' then 'i'. When P has completed 'g' and Q has completed 'i', R should perform 'j'. On completion of 'j', R should signal this fact to CP. This sequence of remote procedure calls is set up by the illustrated signalling.

R is configured by receiving from CP the signals addR({ },{1,2}) which sets up 'e' ("execute immediately; on completion assert signals '1' and '2'") and addR({3,4}, {irq1}) which sets up 'j' ("execute on reception of '3' and '4'; on completion assert interrupt irq1"). P is configured by receiving from CP the signals addP({1},{ }) which sets up 'f' ("execute on reception of '1'; on completion no signal required") and addP({ },{3}) which sets up 'g' ("execute immediately; on completion assert signal '3'"). Note that 'g' automatically waits, since it is queued behind 'f' in P's task queue. Q is configured by receiving from CP the signals addQ({2},{ }) which sets up 'h' ("execute on reception of '2'; on completion no signal required") and addQ({ },{4}) which sets up 'i' ("execute immediately; on completion assert signal '4'"). Note that 'i' also automatically waits, since it is queued behind 'h' in Q's task queue.

FIG. 8 schematically illustrates a communication pattern in a multiprocessor system comprising a control (i.e. calling) processor CP and three data engines DE0, DE1 and DE2. DE0 is required to execute tasks A and C, DE1 is required to execute task B and DE2 is required to execute task D. It can be seen from FIG. 8 that although tasks A-D are required to execute on remote engines DE0-DE2, an intermediate step in which DE1 signals completion of task B to CP via interrupt request irq1 is retained. This due to the fact that a potential data hazard has been identified during the scheduling and optimisation of these RPCs, as is described in the following.

Both DE1 and DE2 are configured to begin execution of their respective tasks B and D on receipt of the signal event0 from DE0. This could for example result from the fact that DE0 only has a single signal (namely "event0") by means of which it can communicate with the other remote engines DE1 and DE2 in this multiprocessor system. The signals available for communication between the remote engines of the multiprocessor system in this example form part of the runtime resource description with reference to which the instruction reordering is performed.

As a consequence, were DE2 to have had task D placed in its task queue at the same time that task A was allocated to DE0 and task B was placed in the task queue of DEI, then once DE0 completed task A and issued the signal event0, not only would DE1 (correctly) begin executing task B, but also DE2 would incorrectly begin executing task D. In the illustrated example, it has been recognised that task D is dependent on task C (i.e. it is essential that task C is completed before task D begins) and hence the illustrated communication pattern has been set up, namely that on completion of task B DE1 signals this fact to CP via interrupt request irq1, and only then does CP initiate task C on DE0 and add task D to the task queue of DE2, using the signal add(2,D,event0) to make this task wait for receipt of signal event0 before beginning. Hence, on completion of task C DE0 again issues signal event0 and then DE2 begins execution of task D. On completion of task D, DE2 signals this fact to CP via interrupt request irq2. Hence, the "programmer's view", namely synchronous RPCs for tasks A to D, has been transformed into asynchronous RPCs to the extent that the data dependencies between these tasks allows, taking into account the available signalling mechanisms between the remote engines DE0, DE1 and DE2 in the multiprocessor system.

Some of the optimizations above depend on detecting that two operations are adjacent in the sequence of operations after reordering. When optimizing a mixture of RPC operations and non-RPC operations with some data dependencies between the two classes, it has been found that a classic instruction scheduling algorithm often generated sequences of alternating RPC and non-RPC operations and that this alternation blocked further optimization. In particular, low-priority operations were often found to be blocking high-priority operations and attempts to assign static priorities to avoid this would fix one example, only to break another example. There was no single static priority mechanism that would meet all needs.

This problem is addressed by adopting the following priority mechanism incorporated into the scheduler. Initially, all operations are assigned a static priority. Subsequently, if it is found that the highest priority operation is (only) dependent on low priority operations, the priority of those low priority operations is raised. This combination of priority inheritance with instruction scheduling is now discussed with reference to FIG. 9.

Figure 9:
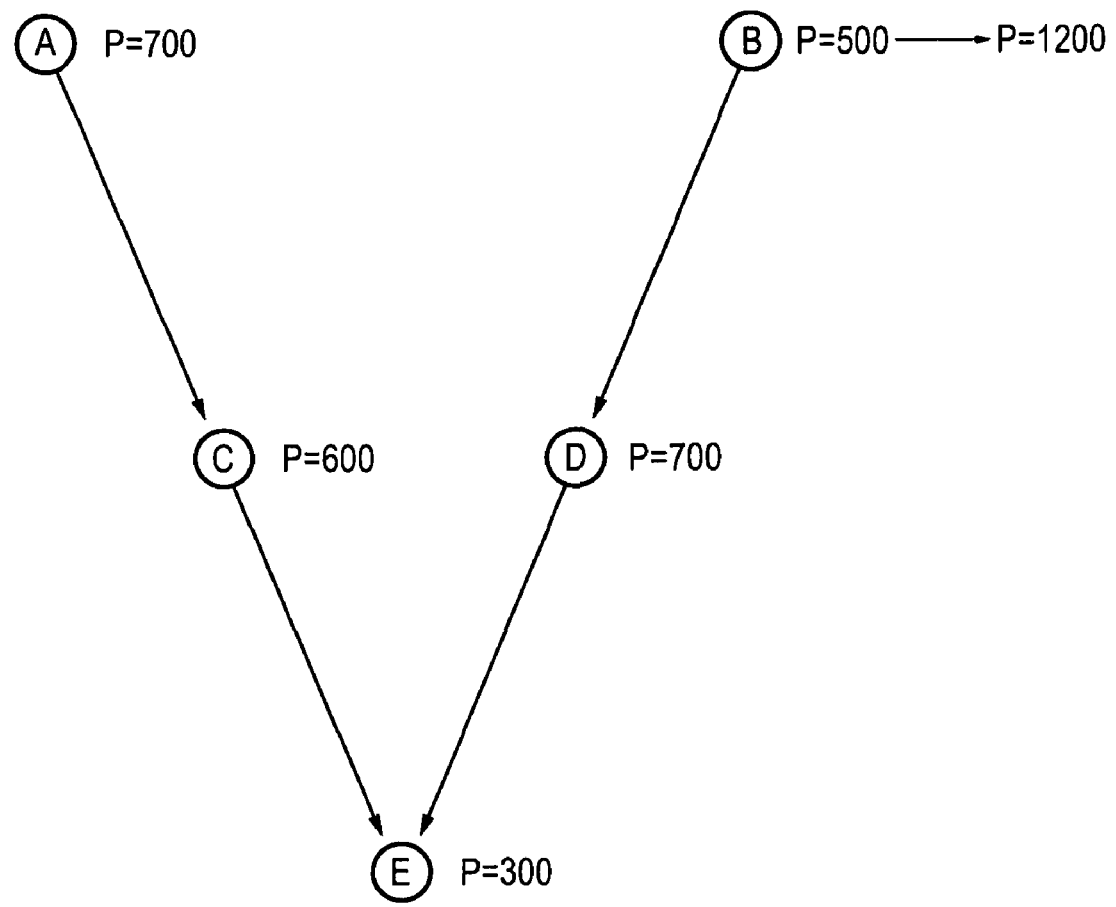
FIG. 9 schematically illustrates five interdependent instructions and their relative priorities.

FIG. 9 schematically illustrates a set of five instructions A-E, each instruction having an associated priority (e.g. instruction A has priority P=700). The arrows indicate the dependencies between the instructions, i.e. instruction C depends on instruction A, instruction D depends on instruction B, and instruction E depends on both instructions C and D. This graph of instruction interdependencies could for example be identified after the RPC expansion step illustrated in FIG. 3. In the RPC scheduling and optimisation step 155 in FIG. 3, it will be seen that various reorderings of the instructions could take place. However, it has been found that a step-by-step approach which prioritises higher priority instructions over lower priority instructions would schedule instructions A and C before instruction B, i.e. the final sequence would be ACBDE. Whilst being a valid instruction schedule, this ordering results in the high priority instruction D being scheduled fourth in the sequence of five instructions due to its dependency on the lower priority instruction B. According to the techniques of the present invention it is recognised that if the priority of instruction B is raised (specifically if it is raised to above 600), then this will permit the scheduler to order the instructions as ABDCE, thus promoting instruction D to third place in the sequence of five, without affecting the semantic meaning of the program. In the illustrated embodiment, the priority of B is raised by incrementing B's priority by D's priority (i.e. adding 700 to give 1200). This has the advantage that using this technique means that if several instructions inherit priorities, their relative priorities are preserved.

In one embodiment, the priorities assigned to different classes of operation within a basic block are as follows:

```
RPC_ReleaseRoom -> 600
RPC_AcquireData -> 500
FIFO_AcquireRoom -> 400
FIFO_AcquireData -> 400
RPC_AcquireRoom -> 300
FIFO_ReleaseData -> 200
FIFO_ReleaseRoom -> 200
RPC_ReleaseData -> 100
Assignment -> 100
``` where an assignment operation is allowed to inherit the priority of any other operation that depends on it as described above. The steps in scheduling a sequence of instructions 'I' to produce a new sequence of instructions 'R' are as follows:
1) set the list 'R' to the empty sequence;
2) if 'I' is the empty sequence, stop;
3) let 'i' be the highest priority instruction 'i' in 'I' (if there are two instructions of equal priority, the earlier instruction is considered to be higher priority);
4) construct a list 'L' of all instructions that 'i' depends on and that have not yet been scheduled;
5) if 'L' is the empty sequence, add 'i' to 'R' and goto 2;
6) if all instructions in 'L' can inherit the priority of higher priority instructions, then:
  6a) for each instruction in 'L' increase its priority by the priority of 'i';
  6b) goto step (3);
7) let 'j' be the highest priority instruction that is lower priority then 'i' (if there are two instructions of equal priority, the earlier instruction is considered to be higher priority); and
  8) assign 'j' to 'i' and goto step (3).

Figure 10:
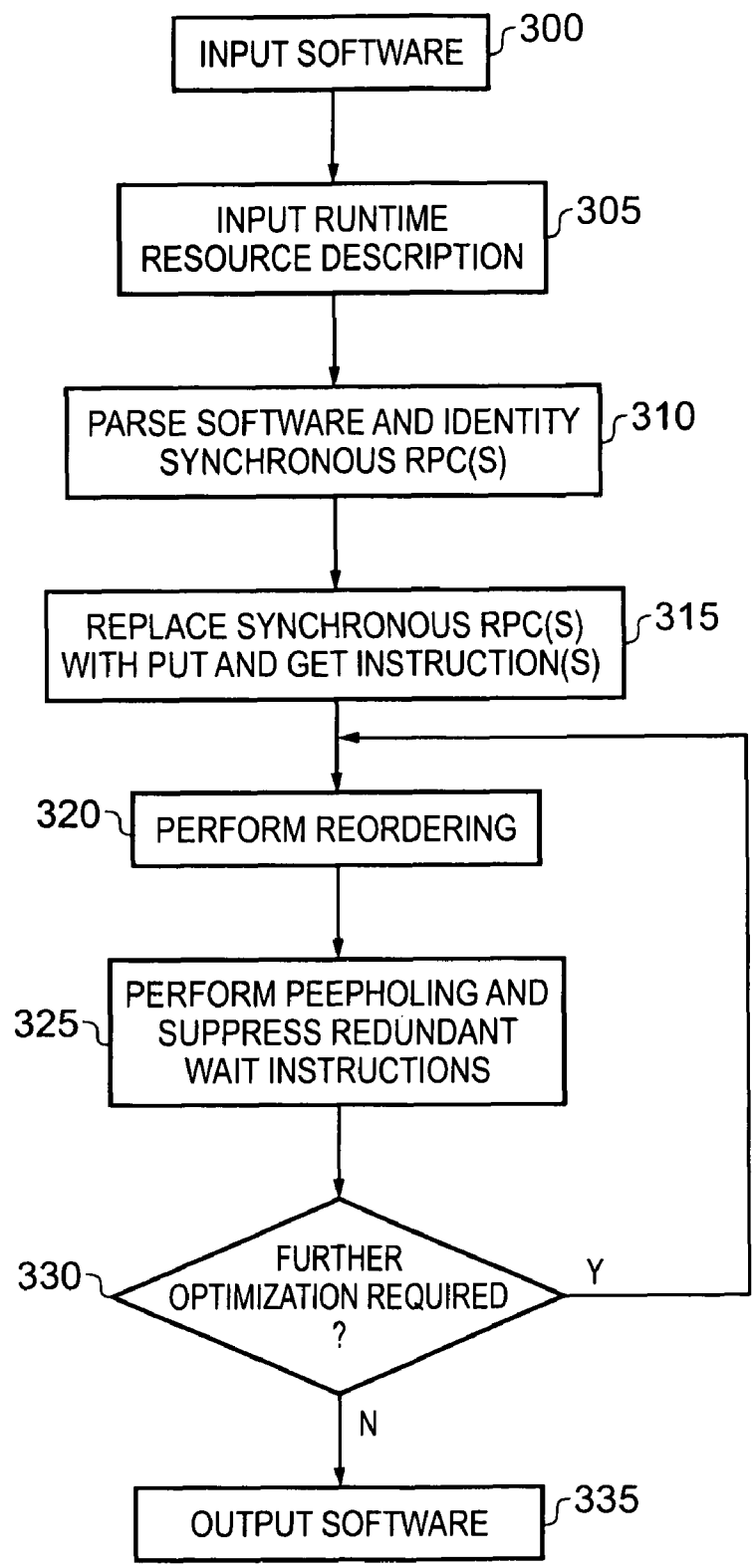
FIG. 10 schematically illustrates a series of steps taken in one embodiment.

Note that the task of finding the next highest priority instruction can be simplified if instructions are kept in a priority list. FIG. 10 schematically illustrates a series of steps taking when the method of one embodiment is carried out. The flow begins at step 300 when the software to be handled is input and at step 305 a runtime resource description of the multiprocessor system on which the software is to be executed is also input. At step 310 the software is parsed and the synchronous RPC(s) therein are identified. At step 315 the synchronous RPC(s) are replaced with "put" and "get" instruction(s), as described above. At step 320 reordering of the instructions within predetermined constraints is carried out and at step 325 a peepholing process identifies redundant wait instructions and suppresses them. At step 330 it is identified if further optimisation is required and if it is the flow returns to step 320. When no further optimisation is required the flow concludes at step 335 and the software is output.

Figure 11:
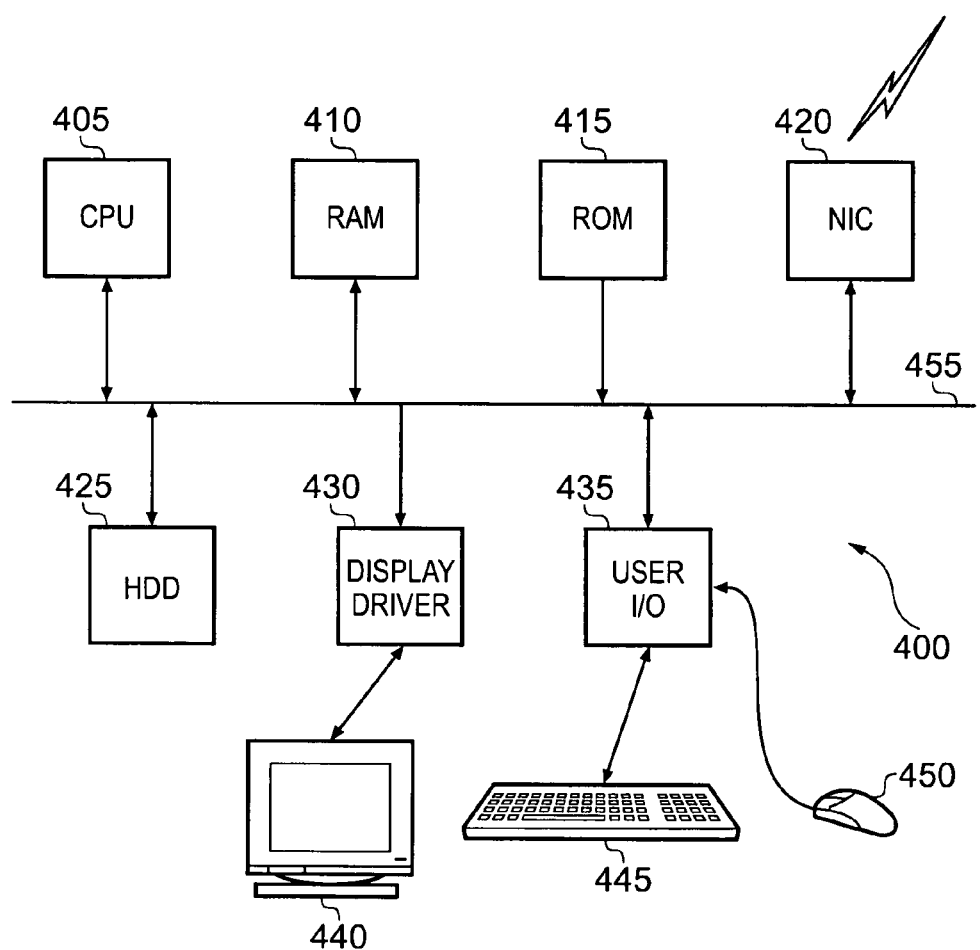
FIG. 11 schematically illustrates a general purpose computer on which some embodiments may be implemented.

FIG. 11 schematically illustrates a general purpose computer 400 of the type that may be used to implement the above described techniques and in particular the method of reducing inter-task latency for software comprising a sequence of instructions including at least one synchronous remote procedure call to be executed on a multiprocessor system. The general purpose computer 400 includes a central processing unit 405, a random access memory 410, a read only memory 415, a network interface card 420, a hard disc drive 425, a display driver 430 and a monitor 440 and a user input/output circuit 435 with a keyboard 445 and mouse 450 all connected via a common bus 455. In operation the central processing unit 405 will execute computer program instructions that may be stored in one or more of the random access memory 410, the read only memory 415 and the hard disc drive 425 or dynamically downloaded via the network interface card 420. The results of the processing performed may be displayed to a user via the display driver 430 and the monitor 440. User inputs for controlling the operation of the general purpose computer 400 may be received via the user input/output circuit 435 from the keyboard 445 or the mouse 450. It will be appreciated that the computer program could be written in a variety of different computer languages. The computer program may be stored and distributed on a recording medium or dynamically downloaded to the general purpose computer 400. When operating under control of an appropriate computer program, the general purpose computer 400 can perform the above described techniques and can be considered to form an apparatus for performing the above described techniques. The architecture of the general purpose computer 400 could vary considerably and FIG. 11 is only one example.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A method of reducing inter-task latency for software comprising a sequence of instructions including a synchronous remote procedure call executed on a multiprocessor system, said multiprocessor system comprising a calling processor and at least one remote engine, the method comprising the steps of:
  inputting said software;
  inputting a runtime resource description, said runtime resource description describing a runtime environment of said multiprocessor system;
  identifying said synchronous remote procedure call in said sequence of instructions;
  replacing said synchronous remote procedure call in said sequence of instructions with an initiation instruction and a wait instruction to generate a substitute sequence of instructions;
  identifying dependencies between instructions in said substitute sequence of instructions;

reordering said substitute sequence of instructions with reference to said runtime resource description and said dependencies to generate a reordered sequence of instructions; and outputting said reordered sequence of instructions.

2. The method according to claim 1, wherein said sequence of instructions includes a plurality of synchronous remote procedure calls, said identifying said remote procedure call step comprises identifying said plurality of synchronous remote procedure calls, and said replacing step comprises replacing each instruction of at least a subset of said plurality of synchronous remote procedure calls with a corresponding initiation instruction and wait instruction.

3. The method according to claim 1, further comprising a step of suppressing at least one wait instruction determined to be redundant following said reordering.

4. The method according to claim 3, further comprising a step of identifying at least two wait instructions and reordering said at least two wait instructions to be adjacent to each other in said sequence.

5. The method according to claim 4, wherein said reordering said at least two wait instructions is followed by a peepholing step in which adjacent instructions are examined.

6. The method according to claim 1, wherein said multiprocessor system comprises at least two remote engines and the method further comprises introducing signalling between said at least two remote engines.

7. The method according to claim 6, wherein said signalling comprises task triggering signals.

8. The method according to claim 6, wherein said signalling further comprises data provision.

9. The method according to claim 6, wherein said signalling comprises an idle status notification.

10. The method according to claim 6, wherein said signalling comprises a task completion signal.

11. The method according to claim 10, wherein said task completion signal is specified by said calling processor.

12. The method according to claim 11, wherein at least one remote engine is configured by said calling processor to begin a predetermined task on receipt of said task completion signal.

13. The method according to claim 10, wherein said task completion signal indicates completion of a predetermined number of tasks.

14. The method according to claim 6, wherein said runtime resource description comprises a description of available signals between said at least two remote engines.

15. The method according to claim 1, wherein said reordering step further comprising identifying task interdependencies which could cause at least one data hazard when said software is executed on said multiprocessor system, and performing said reordering to avoid said at least one data hazard.

16. The method according to claim 1, wherein said at least one remote engine comprises a pending task queue configured to hold at least one indication of a pending task for subsequent execution by that remote engine and said initiation instruction is configured to place an indication of a pending task in said pending task queue.

17. The method according to claim 16, wherein said pending task queue is a first in first out (FIFO) queue.

18. The method according to claim 16, wherein said runtime resource description comprises a depth of said pending task queue, and said reordering is performed such that when said software is executed on said multiprocessor system a number of pending tasks queued in said pending task queue will not exceed said depth.

19. The method according to claim 16, wherein said initiation instruction is a pending task queue entry acquisition instruction, and said replacing step further comprises introducing a pending task queue data release instruction.

20. The method according to claim 16, wherein said at least one remote engine comprises sequential pending task queues.

21. The method according to claim 1, wherein said at least one remote engine comprises a completed task queue configured to hold at least one indication of a task completed by that remote engine.

22. The method according to claim 21, wherein said completed task queue is a first in first out (FIFO) queue.

23. The method according to claim 21, wherein said wait instruction is a completed task queue data acquisition instruction, and said replacing step further comprises introducing a completed task queue entry release instruction.

24. The method according to claim 21, wherein said at least one remote engine comprises sequential completed task queues.

25. The method according to claim 1, wherein said instructions each have an associated priority, and said reordering comprises positioning instructions having a higher priority before instructions having lower priorities to an extent allowed by inter-instruction dependencies.

26. The method according to claim 25, further comprising a priority adjustment step, in which at least one priority is adjusted.

27. The method according to claim 26, wherein said at least one priority is associated with a lower priority instruction upon which a higher priority instruction depends, and said priority adjustment step comprises raising said at least one priority associated with said lower priority instruction.

28. The method according to claim 1, wherein said runtime resource description comprises a description of hardware available in said multiprocessor system.

29. The method according to claim 28, wherein said runtime resource description comprises a software controlled view of said hardware available in said multiprocessor system.

30. The method according to claim 1, further comprising reducing a number of interrupts that will be received by said calling processor when said software is executed on said multiprocessor system.

31. The method according to claim 1, wherein said identifying said at least one synchronous remote procedure call in said sequence of instructions further comprises determining if said at least one synchronous remote procedure call is only executed when a runtime condition is true; and said replacing said at least one synchronous remote procedure call in said sequence of instructions with an initiation instruction further comprises introducing said runtime condition as an argument of said initiation instruction.

32. The method according to claim 1, wherein said at least one remote engine comprises a processor.

33. The method according to claim 1, wherein said at least one remote engine comprises a hardware engine.

34. The method according to claim 1, wherein said sequence of instructions includes a plurality of synchronous remote procedure calls and said identifying said remote procedure call step comprises identifying said plurality of synchronous remote procedure calls, said method further comprising a merging step after said identifying said remote procedure call step in which:

at least two sequential remote procedure calls to single remote engine are merged into one remote procedure call to said single remote engine.

35. A non-transitory computer-readable medium storing a program which when executed on a computer causes the computer to carry out a method of reducing inter-task latency for software comprising a sequence of instructions including a synchronous remote procedure call to be executed on a multiprocessor system, said multiprocessor system comprising a calling processor and at least one remote engine, the method comprising the steps of:

inputting said software;
inputting a runtime resource description, said runtime resource description describing a runtime environment of said multiprocessor system;
identifying said synchronous remote procedure call in said sequence of instructions;
replacing said synchronous remote procedure call in said sequence of instructions with an initiation instruction and a wait instruction to generate a substitute sequence of instructions;
identifying dependencies between instructions in said substitute sequence of instructions;
reordering said substitute sequence of instructions with reference to said runtime resource description and said dependencies to generate a reordered sequence of instructions; and
outputting said reordered sequence of instructions.

36. A data processing apparatus for reducing inter-task latency for software comprising a sequence of instructions including a synchronous remote procedure call executed on a multiprocessor system, said multiprocessor system comprising a calling processor and at least one remote engine, the apparatus comprising:

a software input configured to input said software;
a runtime resource description input configured to input a runtime resource description, said runtime resource description describing a runtime environment of said multiprocessor system;
an identification unit configured to identify said synchronous remote procedure call in said sequence of instructions;
a replacement unit configured to replace said synchronous remote procedure call in said sequence of instructions with an initiation instruction and a wait instruction to generate a substitute sequence of instructions;
an identification unit configured to identify dependencies between instructions in said substitute sequence of instructions;
a reordering unit configured to reorder said substitute sequence of instructions with reference to said runtime resource description and said dependencies to generate a reordered sequence of instructions; and
an output configured to output said reordered sequence of instructions.

37. A data processing apparatus for reducing inter-task latency for software comprising a sequence of instructions including a synchronous remote procedure call executed on a multiprocessor system, said multiprocessor system comprising a calling processor and at least one remote engine, the apparatus comprising:

software input means for inputting said software;
runtime resource description input means for inputting a runtime resource description, said runtime resource description describing a runtime environment of said multiprocessor system;
identifying means for identifying said synchronous remote procedure call in said sequence of instructions;
replacing means for replacing said synchronous remote procedure call in said sequence of instructions with an initiation instruction and a wait instruction to generate a substitute sequence of instructions;
identification means for identifying dependencies between instructions in said substitute sequence of instructions;
reordering means for reordering said substitute sequence of instructions with reference to said runtime resource description and said dependencies to generate a reordered sequence of instructions; and
output means for outputting said reordered sequence of instructions.

* * * * *